(12) United States Patent
Yamauchi et al.

(10) Patent No.: US 7,204,222 B2
(45) Date of Patent: Apr. 17, 2007

(54) DRIVE SYSTEM AND AUTOMOBILE

(75) Inventors: Tomokazu Yamauchi, Toyota (JP); Nobuyuki Taki, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 95 days.

(21) Appl. No.: 11/057,013

(22) Filed: Feb. 14, 2005

(65) Prior Publication Data

US 2005/0178594 A1    Aug. 18, 2005

(30) Foreign Application Priority Data

| Feb. 17, 2004 | (JP) | ............................. 2004-040051 |
| Mar. 2, 2004 | (JP) | ............................. 2004-057547 |
| Sep. 10, 2004 | (JP) | ............................. 2004-263386 |

(51) Int. Cl.
*F02N 11/00* (2006.01)
*F02N 17/00* (2006.01)
*B60K 6/00* (2006.01)

(52) U.S. Cl. .................................................. 123/179.4

(58) Field of Classification Search ............. 123/179.4, 123/198 R; 180/65.2
See application file for complete search history.

(56) References Cited

U.S. PATENT DOCUMENTS 7,066,127 B2 *  6/2006  Flanagan et al. ......... 123/179.4

FOREIGN PATENT DOCUMENTS

| DE | 199 58 403 A1 | 6/2001 |
| DE | 103 60 795 A1 | 7/2005 |
| JP | 09-322311 | 12/1997 |
| JP | 10-331677 | 12/1998 |
| JP | 11-107793 | 4/1999 |
| JP | 2001-119811 | 4/2001 |
| JP | 2001-193540 | 7/2001 |
| JP | 2003-237393 | 8/2003 |

OTHER PUBLICATIONS

German language version of German Office Action for Appln. No. 10 2005 007 069.8-13, issued Jul. 19, 2006.
English translation of German Office Action for Appln. No. 10 2005 007 069.8-13, issued Jul. 19, 2006.

* cited by examiner

*Primary Examiner*—Stephen K. Cronin
*Assistant Examiner*—Arnold Castro
(74) *Attorney, Agent, or Firm*—Kenyon & Kenyon LLP

(57) ABSTRACT

A counterweight 40 attached to a crankshaft 38 has a projection 42, which is aligned with and faces an electromagnet 44 attached to a crank casing 46 when the crankshaft 38 is at a preset rotational position of ensuring good startability of an engine 22. Engine stop control starts a power supply to the electromagnet 44 to attract the projection 42 of the counterweight 40 at a timing when the projection 42 of the counterweight 40 is practically aligned with the electromagnet 44, on the condition that the revolution speed of the crankshaft 38 is lowered to or below a preset level immediately before a full stop of rotation of the crankshaft 38. This engine stop control stops the rotation of the crankshaft 38 and desirably holds the crankshaft 38 at the preset rotational position of ensuring good startability of the engine 22.

3 Claims, 18 Drawing Sheets

DRIVE SYSTEM AND AUTOMOBILE

BACKGROUND OF THE INVENTION

1. Field of the Invention

The present invention relates to a drive system and an automobile with the drive system mounted thereon, as well as a control method of the drive system.

2. Description of the Prior Art

One proposed drive system includes a magnet generator having a flywheel linked to a crankshaft as a rotor and an armature arranged in the inner bore of the flywheel (see, for example, Japanese Patent Laid-Open Gazette No. 2001-193540). This proposed drive system adjusts the short circuit current supplied to the armature coil to regulate a braking torque applied to a crankshaft. The regulation of the braking torque sets the stop position of the crankshaft in a target range and thereby enhances the startability of an internal combustion engine.

Another proposed drive system includes a first motor, an engine, and a drive shaft respectively connected with a sun gear, a carrier, and a ring gear of a planetary gear mechanism, as well as a second motor linked to the drive shaft (see, for example, Japanese Patent Laid-Open Gazette No. 2003-237392). This prior art drive system, in response to a stop command of the engine, prohibits fuel injection into the engine and controls the operation of the first motor to output a required torque for braking the rotation of the engine to the carrier and thereby stop the rotation of the engine.

SUMMARY OF THE INVENTION

For the technological advancement, it is generally important to propose systems attaining an identical function but having different structures. Size reduction of the system attaining the identical function is advantageous, especially when the system is mounted in a limited space, such as an automobile. The enhanced energy efficiency is also a requisition in the auto industries.

In the prior art drive system disclosed in Japanese Patent Laid-Open Gazette No. 2003-237392, application of the first motor to stop the engine may, however, be undesirable in some cases. The first motor generates electric power when being controlled to brake the rotation of the engine. The accumulator that transmits electric power to and from the first motor may, however, not have the marginal capacity to accumulate the electric power generated by the first motor. This leads to a failure in braking the rotation of the engine. Stopping the engine at a predetermined target stop position is desirable to enhance the startability of the engine and ensure a smooth restart of the engine. The rotation of the engine becomes unstable immediately before its full stop according to the driving conditions of the second motor and the engine. There may thus be difficulty in using only the first motor to stop the engine accurately at the target stop position.

The object of the present invention is thus to provide drive systems of different structures to stop and hold a crankshaft of an internal combustion engine at a preset rotational position. The object of the invention is also to reduce the total size of the drive system. The object of the invention is further to enhance the energy efficiency of the drive system.

The object of the present invention is to effectively stop rotation of the internal combustion engine. The object of the invention is also to prevent an accumulator from being overcharged or being charged with overvoltage in the process of stopping the internal combustion engine. The object of the invention is further to stop the internal combustion engine accurately at a target stop position.

At least part of the above and the other related objects is actualized by a drive system, an automobile, and a drive system control method of the invention described below.

The first drive system of the invention is the drive system of driving a drive shaft, and the drive system includes: an internal combustion engine having a crankshaft as its output shaft; a position holding module that is directly attached to the crankshaft of the internal combustion engine and applies either of an electromagnetic force and a mechanical force to hold the crankshaft at a preset rotational position; and a stop control module that, in response to fulfillment of a predetermined stop condition, controls the internal combustion engine and the position holding module to stop the internal combustion engine while holding the crankshaft at the preset rotational position.

In the first drive system of the invention, the position holding module directly attached to the crankshaft applies an electromagnetic force or a mechanical force to hold the crankshaft at the preset rotational position. The direct attachment of the position holding module to the crankshaft desirably reduces the total size of the drive system.

In the first drive system of the invention, the position holding module may apply an electromagnetic attraction force to part of a counterweight attached to the crankshaft as an attraction target, so as to hold the crankshaft at the preset rotational position. In this case, the position holding module may include an electromagnetic attraction unit that is positioned to stop and hold the crankshaft at the preset rotational position when the electromagnetic attraction force is applied to the attraction target. Additionally, in this case, the stop control module may control the electromagnetic attraction unit of the position holding module to apply the electromagnetic attraction force to the attraction target at a specific alignment timing of the attraction target with the electromagnetic attraction unit after a rotation speed of the crankshaft becomes less than a predetermined revolution speed with a stop of operation of the internal combustion engine. The structure of this embodiment sets part of the counterweight to the attraction target. This attains further size reduction. Simple activation of the electromagnetic attraction unit at the timing of alignment with the attraction target effectively holds the crankshaft at the preset rotational position.

Further, in the first drive system of the invention, the stop control module may turn the crankshaft to the preset rotational position after a stop of rotation of the crankshaft. In this case, the position holding module may include motion conversion mechanism that converts a rotational motion of the crankshaft into a reciprocating motion of a reciprocating member with one end set at the preset rotational position of the crankshaft, and a shift mechanism that shifts and holds the reciprocating member to the one end of the reciprocating motion. Additionally, in this case, the shift mechanism may include electromagnetic attraction unit that applies an electromagnetic attraction force to part of a counterweight attached to the crankshaft as an attraction target, so as to hold the crankshaft at the preset rotational position. The structure of this embodiment turns the crankshaft to the preset rotational position after a full stop. Simple application of the force converted by the motion conversion mechanism to the reciprocating member desirably turns and holds the crankshaft to the preset rotational position.

In the first drive system of the invention, the drive system may further include: an electric braking module that is capable of braking the crankshaft or the output shaft of the internal combustion engine through input and output of electric power; and an accumulator module that is capable of transmitting electric power to and from the electric braking module, wherein the position holding module may function as a mechanical braking module to mechanically brake the output shaft of said internal combustion engine, and the stop control module may control the internal combustion engine to stop operation of the internal combustion engine, while controlling the electric braking module and the mechanical braking module to stop rotation of said internal combustion engine. The rotation of the internal combustion engine is stopped by means of the braking force of the electric braking module and the braking force of the mechanical braking module. The 'mechanical braking module' includes a brake mechanism that takes advantage of frictional force to brake the output shaft of the internal combustion engine.

In the first drive system of the invention equipped with the electric braking module, the stop control module may control the electric braking module and the mechanical braking module to stop the rotation of the internal combustion engine within an allowable range of a charge-discharge limit of the accumulator module. In addition, the electric braking module may include a motor that is capable of generating electric power, the drive system may further include: a three shaft-type power input output module that is linked to three shafts, that is, the output shaft of the internal combustion engine, a rotation shaft of the motor, and the drive shaft, where power input to and output from a residual one shaft is automatically determined according to powers input to and output from any two shafts among the three shafts; and a drive shaft motor that is capable of inputting and outputting power from and to the drive shaft. In this case, the drive system may include: a power demand setting module that sets a power demand required to output the drive shaft, wherein the stop control module may control the electric braking module, the drive shaft motor, and the mechanical braking module to output a power corresponding to the setting of the power demand to the drive shaft, while stopping the rotation of the internal combustion engine within an allowable range of a charge-discharge limit of the accumulator module. Further, in this case, the stop control module may set a target driving force of the electric braking module and a target driving force of the drive shaft motor and execute a first control of controlling the electric braking module and the drive shaft motor to produce the respective target driving forces and thereby output the power corresponding to the setting of the power demand to the drive shaft while stopping the rotation of the internal combustion engine, when the first control causes a sum of an electric power input to and output from the electric braking module and an electric power input to and output from the drive shaft motor to exceed the allowable range of the charge-discharge limit of the accumulator module, the stop control module setting the target driving force of the electric braking module, the target driving force of the drive shaft motor, and a target driving force of the mechanical braking module and executing a second control of controlling the electric braking module, the drive shaft motor, and the mechanical braking module, instead of the first control, to produce the respective target driving forces while keeping the sum of the electric powers within the allowable range of the charge-discharge limit of the accumulator module. This arrangement ensures the enhanced energy efficiency within the allowable range of the charge-discharge limit of the accumulator module.

In the first drive system of the invention equipped with the electric braking module, the drive system may further include: a drive shaft motor that is capable of inputting and outputting power from and to the drive shaft, wherein the electric braking module may include a pair rotor motor, which has a first rotor connected to the output shaft of the internal combustion engine and a second rotor connected to the drive shaft and relatively rotates the first rotor and the second rotor through electromagnetic interaction.

In the first drive system of the invention equipped with the electric braking module, the drive system may further include: a revolution speed measurement module that measures a revolution speed of the internal combustion engine, wherein the stop control module may control the electric braking module and the mechanical braking module to stop the rotation of the internal combustion engine, based on the measured revolution speed. In this case, wherein the stop control module may control the electric braking module and the mechanical braking module to brake the internal combustion engine with at least a braking force of the mechanical braking module when the measured revolution speed of the internal combustion engine is not less than a predetermined level, while controlling the electric braking module and the mechanical braking module to brake the internal combustion engine with a braking force of the electric braking module when the measured revolution speed of the internal combustion engine is less than the predetermined level. The internal combustion engine is braked by means of at least the mechanical braking module at the high revolution speed of the internal combustion engine, which gives a relatively large generated output of the electric braking module. This arrangement desirably prevents the accumulator module from being overcharged or being charged with overvoltage.

Moreover, in the first drive system of the invention equipped with the electric braking module, the stop control module may control the electric braking module and the mechanical braking module to stop the internal combustion engine at a target stop position. In this case, the drive system may further includes: a rotational position detection module that detects a rotational position of the internal combustion engine, wherein when the detected rotational position of the internal combustion engine is close to the target stop position, the stop control module may control the mechanical braking module to apply a braking force and stop the internal combustion engine at the target stop position. Additionally, in this case, the rotational position detection module may detect the rotational position of the internal combustion engine, based on a rotational position of the motor and a rotational position of the drive shaft motor. This arrangement stops the internal combustion engine accurately at the target stop position, even when the internal combustion engine is in the state of unstable rotation immediately before its full stop.

The second drive system of the invention is the drive system of driving a drive shaft, and the drive system includes: an internal combustion engine having a crankshaft as its output shaft; a magnetic field generation module that is arranged to generate a magnetic field of a preset magnetic polarity at a predetermined position of the crankshaft of the internal combustion engine toward an outer side of the crankshaft; and a position holding module that utilizes a magnetic force produced by an interaction with the magnetic field generated by the magnetic field generation module to hold the crankshaft of the internal combustion engine at a preset rotational position.

The second drive system of the invention has the magnetic field generation module that is arranged to generate a magnetic field of a preset magnetic polarity at a predetermined position of the crankshaft of the internal combustion engine toward an outer side of the crankshaft, and the position holding module that utilizes the magnetic force produced by the interaction with the magnetic field generated by the magnetic field generation module to hold the crankshaft of the internal combustion engine at the preset rotational position. This arrangement enables the crankshaft to be held at the preset rotational position at a stop of the internal combustion engine. The preset rotational position may be a position of ensuring good startability of the internal combustion engine. This ensures good startability when the internal combustion engine restarts.

In the second drive system of the invention, the magnetic field generation module may include a permanent magnet that is attached to the crankshaft and is magnetized to have either an S magnetic polarity or an N magnetic polarity toward the outer side of the crankshaft, and the position holding module may include a permanent magnet that is arranged in a periphery of the crankshaft to locate the crankshaft at the preset rotational position when being practically aligned with the predetermined position of the crankshaft in the course of rotation of the crankshaft, and is magnetized to have a magnetic polarity opposite to the magnetic polarity of the facing permanent magnet of the magnetic field generation module. In addition, the magnetic field generation module may include a permanent magnet that is attached to the crankshaft and is magnetized to have either an S magnetic polarity or an N magnetic polarity toward the outer side of the crankshaft, and the position holding module may include an electromagnet that is arranged in a periphery of the crankshaft to locate the crankshaft at the preset rotational position when being practically aligned with the predetermined position of the crankshaft in the course of rotation of the crankshaft, and is magnetized to have a magnetic polarity opposite to the magnetic polarity of the facing permanent magnet of the magnetic field generation module, the drive system may further include: a power supply control module that starts a power supply to the position holding module in response to fulfillment of a predetermined stop condition to hold the crankshaft at the preset rotational position.

In the second drive system of the invention, the drive system may further include: a stop position restriction module that utilizes the magnetic force produced by the interaction with the magnetic field generated by the magnetic field generation module to restrain the crankshaft from stopping at an angle of approximately 90 degrees deviated from the preset rotational position. In this case, the magnetic field generation module may include a permanent magnet that is attached to the crankshaft and is magnetized to have either an S magnetic polarity or an N magnetic polarity toward the outer side of the crankshaft, and the stop position restriction module may include either of a permanent magnet and an electromagnet that is arranged in a periphery of the crankshaft to locate the crankshaft at the angle of approximately 90 degrees deviated from the preset rotational position when being practically aligned with the predetermined position of the crankshaft in the course of rotation of the crankshaft, and is magnetized to have a magnetic polarity identical with the magnetic polarity of the facing permanent magnet of the magnetic field generation module.

The first automobile of the invention includes: an internal combustion engine having a crankshaft as its output shaft; a position holding module that is directly attached to the crankshaft of the internal combustion engine and applies either of an electromagnetic force and a mechanical force to hold the crankshaft at a preset rotational position; a stop control module that, in response to fulfillment of a predetermined auto stop condition, controls the internal combustion engine and the position holding module to stop the internal combustion engine while holding the crankshaft at the preset rotational position; and an auto start module that, in response to fulfillment of a predetermined auto start condition, releases the hold of the crankshaft at the preset rotational position by the position holding module and starts the internal combustion engine.

The first automobile of the invention controls the position holding module directly attached to the crankshaft to apply an electromagnetic force or a mechanical force and thereby hold the crankshaft at the preset rotational position. The direct attachment of the position holding module to the crankshaft desirably saves the space.

In the first automobile of the invention, the automobile may further include: an electric braking module that is capable of braking the crankshaft or the output shaft of the internal combustion engine through input and output of electric power; and an accumulator module that is capable of transmitting electric power to and from the electric braking module, wherein the position holding module may function as a mechanical braking module to mechanically brake the output shaft of the internal combustion engine, and the stop control module may control the internal combustion engine to stop operation of the internal combustion engine, while controlling the electric braking module and the mechanical braking module to stop rotation of the internal combustion engine. The rotation of the internal combustion engine is stopped by means of the braking force of the electric braking module and the braking force of the mechanical braking module. The 'mechanical braking module' includes a brake mechanism that takes advantage of frictional force to brake the output shaft of the internal combustion engine.

The second automobile of the invention includes: an internal combustion engine having a crankshaft as its output shaft; a magnetic field generation module that is arranged to generate a magnetic field of a preset magnetic polarity at a predetermined position of the crankshaft of the internal combustion engine toward an outer side of the crankshaft; a position holding module that utilizes a magnetic force produced by an interaction with the magnetic field generated by the magnetic field generation module to hold the crankshaft of the internal combustion engine at a preset rotational position; a stop control module that, in response to fulfillment of a predetermined auto stop condition, controls the position holding module to hold the crankshaft at the preset rotational position; and an auto start module that, in response to fulfillment of a predetermined auto start condition, releases the hold of the crankshaft at the preset rotational position by the position holding module and starts the internal combustion engine.

The second automobile of the invention has the magnetic field generation module that is arranged to generate a magnetic field of a preset magnetic polarity at a predetermined position of the crankshaft of the internal combustion engine toward an outer side of the crankshaft, and the position holding module that utilizes the magnetic force produced by the interaction with the magnetic field generated by the magnetic field generation module to hold the crankshaft of the internal combustion engine at the preset rotational position. This arrangement enables the crankshaft to be held at the preset rotational position at a stop of the internal combustion engine. The preset rotational position may be a position of ensuring good startability of the internal combustion engine. This ensures good startability when the internal combustion engine restarts.

The control method of the first drive system of the invention is the control method of the drive system that drives a drive shaft, and the drive system includes: an internal combustion engine having a crankshaft as its output shaft; and a position holding module that is directly attached to the crankshaft of the internal combustion engine and applies either of an electromagnetic force and a mechanical force to hold the crankshaft at a preset rotational position, and in response to fulfillment of a predetermined stop condition, the control method controlling the internal combustion engine and the position holding module to stop the internal combustion engine while holding the crankshaft at the preset rotational position.

The control method of the first drive system of the invention controls the position holding module directly attached to the crankshaft to apply an electromagnetic force or a mechanical force and thereby hold the crankshaft at the preset rotational position. The direct attachment of the position holding module to the crankshaft desirably saves the space.

In the control method of the first drive system of the invention, the drive system further include: an electric braking module that is capable of braking the crankshaft or the output shaft of the internal combustion engine through input and output of electric power; and an accumulator module that is capable of transmitting electric power to and from the electric braking module, and the position holding module functions as a mechanical braking module to mechanically brake the output shaft of the internal combustion engine, in response to fulfillment of the predetermined stop condition, the control method controlling the internal combustion engine to stop operation of the internal combustion engine, while controlling the electric braking module and the mechanical braking module to stop rotation of the internal combustion engine within an allowable range of a charge-discharge limit of the accumulator module. The rotation of the internal combustion engine is stopped by means of the braking force of the electric braking module and the braking force of the mechanical braking module.

The control method of the second drive system of the invention is the control method of the drive system that drives a drive shaft, and the drive system includes: an internal combustion engine having a crankshaft as its output shaft; a magnetic field generation module that is arranged to generate a magnetic field of a preset magnetic polarity at a predetermined position of the crankshaft of the internal combustion engine toward an outer side of the crankshaft; and a position holding module that utilizes a magnetic force produced by an interaction with the magnetic field generated by the magnetic field generation module to hold the crankshaft of the internal combustion engine at a preset rotational position, and in response to fulfillment of a predetermined stop condition, the control method controlling the position holding module to hold the crankshaft at the preset rotational position.

The control method of the second drive system of the invention has the magnetic field generation module that is arranged to generate a magnetic field of a preset magnetic polarity at a predetermined position of the crankshaft of the internal combustion engine toward an outer side of the crankshaft, and the position holding module that utilizes the magnetic force produced by the interaction with the magnetic field generated by the magnetic field generation module to hold the crankshaft of the internal combustion engine at the preset rotational position. This arrangement enables the crankshaft to be held at the preset rotational position at a stop of the internal combustion engine. The preset rotational position may be a position of ensuring good startability of the internal combustion engine. This ensures good startability when the internal combustion engine restarts.

DESCRIPTION OF THE PREFERRED EMBODIMENTS

Some modes of carrying out the invention are discussed below as preferred embodiments.

(1) First Embodiment

Figure 1:
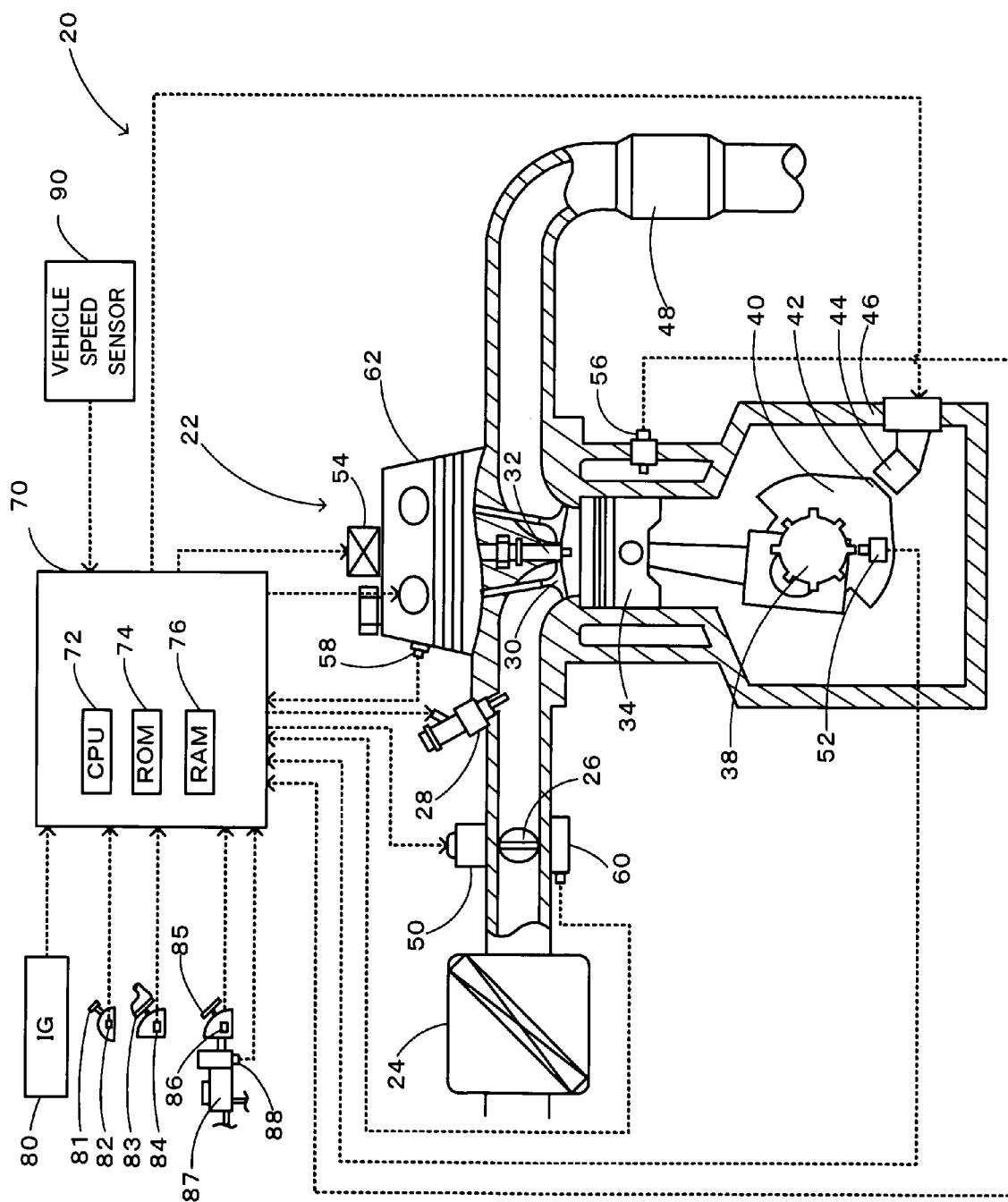
FIG. 1 schematically illustrates the structure of an engine system in a first embodiment of the invention.

FIG. 1 schematically illustrates the structure of an engine system 20 constructed as a drive system including an internal combustion engine stop mechanism and an internal combustion engine auto stop start mechanism in a first embodiment of the invention. The engine system 20 of the first embodiment is mounted on an automobile and has an engine 22 as a power source and a controller 70 for controlling the operations of the engine 22.

The engine 22 is an internal combustion engine that consumes a supply of a hydrocarbon fuel, such as gasoline or light oil, to output power. In the engine 22, a supply of the air cleaned by an air cleaner 24 and taken by means of a throttle valve 26 is mixed with a supply of gasoline injected via a fuel injection valve 28 to an air-fuel mixture. The air-fuel mixture is taken into a combustion chamber via an intake valve 30 and is explosively ignited for combustion with an electric spark made by a spark plug 32. The combustion of the air-fuel mixture generates energy of reciprocating a piston 34. The reciprocating motions of the piston 34 are converted to rotational motions of a crankshaft 38. The exhaust from the engine 22 goes through a catalytic converter (three-way catalyst) 48 for conversion and removal of harmful components, such as carbon monoxide (CO), hydrocarbons (HC), and nitrogen oxides (NOx), and is discharged to the atmosphere. A counterweight 40 having a radially extending projection 42 is attached to the crankshaft 38. A crank casing 46 has an electromagnet 44, which is aligned with and faces the projection 42 of the counterweight 40 when the crankshaft 38 stops at a specific rotational position of ensuring good startability of the engine 22.

The controller 70 is constructed as a microcomputer including a CPU 72, a ROM 74 that stores processing programs, a RAM 76 that temporarily stores data, and input and output ports (not shown). The controller 70 receives, via the non-illustrated input port, signals representing the current conditions of the engine 22 from diversity of sensors, for example, a crank angle $\theta$ or rotational position of the crankshaft 38 detected by and sent from a crank position sensor 52, a cooling water temperature or temperature of cooling water in the engine 22 measured by and sent from a water temperature sensor 56, a cam position or rotational position of a camshaft of opening and closing the intake valve 30 and an exhaust valve for intake and exhaust of the air-fuel mixture into and from the combustion chamber, detected by and sent from a cam position sensor 58, a throttle position or position of the throttle valve 26 detected by and sent from a throttle valve position sensor 60, an ignition signal from an ignition switch 80, a gearshift position SP or current position of a gearshift lever 81 detected by and sent from a gearshift position sensor 82, an accelerator opening Acc corresponding to the driver's step-on amount of an accelerator pedal 83 sensed by and sent from an accelerator pedal position sensor 84, a brake pedal position BP corresponding to the driver's step-on amount of a brake pedal 85 detected by and sent from a brake pedal position sensor 86, a brake master cylinder pressure Pb or pressure of a brake master cylinder 87 measured by and sent from a brake master cylinder pressure sensor 88, and a vehicle speed V measured by and sent from a vehicle speed sensor 90. The controller 70 outputs, via the non-illustrated output port, variety of control signals to drive the engine 22, for example, a driving signal to the fuel injection valve 28, a driving signal to a throttle motor 50 to regulate the position of the throttle valve 26, a control signal to an ignition coil 54 integrated with an igniter, and an operation signal to the electromagnet 44.

The projection 42 of the counterweight 40 attached to the crankshaft 38, the electromagnet 44, and the controller 70 of driving and controlling the electromagnet 44 constitute the internal combustion engine stop mechanism. The diversity of sensors and the controller 70 of controlling an auto stop and an auto start of the engine 22 based on the measurement signals from the diversity of sensors constitute the internal combustion engine auto stop start mechanism.

The engine system 20 constructed as discussed above carries out throttle opening control, fuel injection control, ignition control, and valve timing control to regulate the opening of the throttle valve 26, the fuel injection of the fuel injection valve 28, the ignition timing of the ignition plug 32, and the valve change timing of a variable valve timing mechanism 62. The operations of the engine 22 are accordingly controlled to ensure output of a driving force to the vehicle corresponding to the accelerator opening Acc sensed as the driver's step-on amount of the accelerator pedal 83 and the vehicle speed V measured by the vehicle speed sensor 90.

Figure 2:
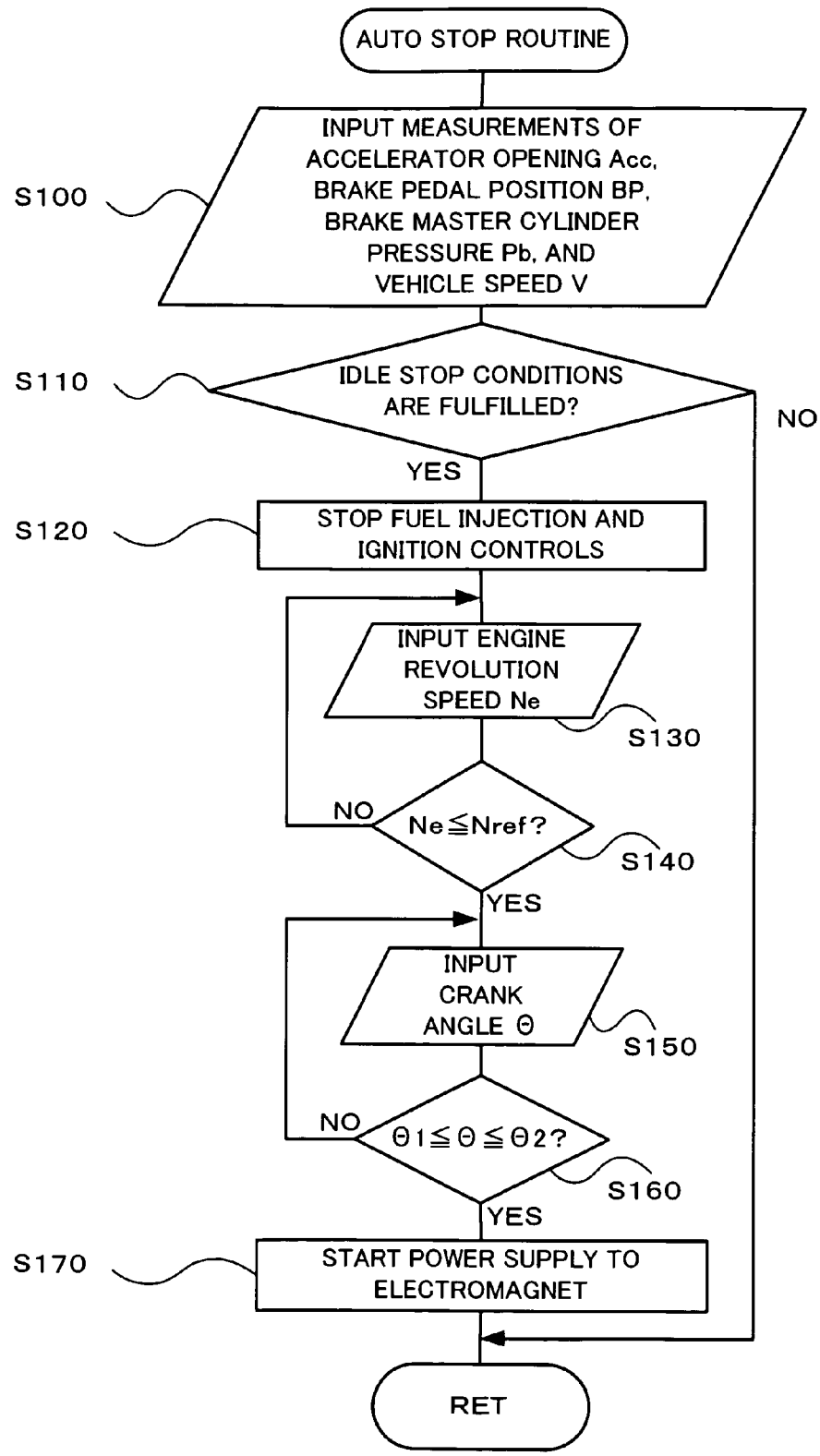
FIG. 2 is a flowchart showing an auto stop routine executed by a controller included in the engine system of the first embodiment.

FIG. 2 is a flowchart showing an auto stop routine executed by the controller 70. The CPU 72 of the controller 70 first receives the measurements of the accelerator opening Acc, the brake pedal position BP, the brake master cylinder pressure Pb, and the vehicle speed V from the accelerator pedal position sensor 84, the brake pedal position sensor 86, the brake master cylinder pressure sensor 88, and the vehicle speed sensor 90 (step S100). The CPU 72 then determines whether all conditions of an idle stop are satisfied, based on the received measurements of the accelerator opening Acc, the brake pedal position BP, the brake master cylinder pressure Pb, and the vehicle speed V (step S110). In this embodiment, the conditions of the idle stop are the accelerator opening Acc set equal to 0, the brake pedal position BP set in ON position, the brake master cylinder pressure Pb of not less than a preset level (for example, of not less than 0.55 MPa), and the vehicle speed V set equal to 0 km/h. In the event of failure to fulfill any of these idle stop conditions at step S110, the CPU 72 immediately exits from this auto stop routine.

In the event of success to fulfill all these idle stop conditions at step S110, on the other hand, the CPU 72 stops the fuel injection control and the ignition control (step S120) and waits until a level of engine revolution speed Ne is lowered to or below a preset threshold value Nref (steps S130 and S140). The engine revolution speed Ne is calculated from the measurements of the crank position sensor 52 according to another control routine (not shown). The threshold value Nref is set to an engine revolution speed immediately before a full stop of rotation of the crankshaft 38, that is, a last turn or a second last turn of the crankshaft 38. The CPU 72 waits until the crank angle $\theta$ enters a range between preset threshold values $\theta 1$ and $\theta 2$ (steps S150 and S160). The threshold values $\theta 1$ and $\theta 2$ are set respectively as a crank angle of starting alignment of the projection 42 and the electromagnet 44 with rotation of the crankshaft 38 and as a crank angle of terminating the alignment of the projection 42 and the electromagnet 44. When the input crank angle $\theta$ enters the range between the threshold values $\theta 1$ and $\theta 2$, the CPU 72 starts a supply of electric power to the electromagnet 44 (step S170) and exits from this auto stop routine. The electromagnetic attraction force of the electromagnet 44 accordingly holds the crankshaft 38 at the specific rotational position.

Figure 3:
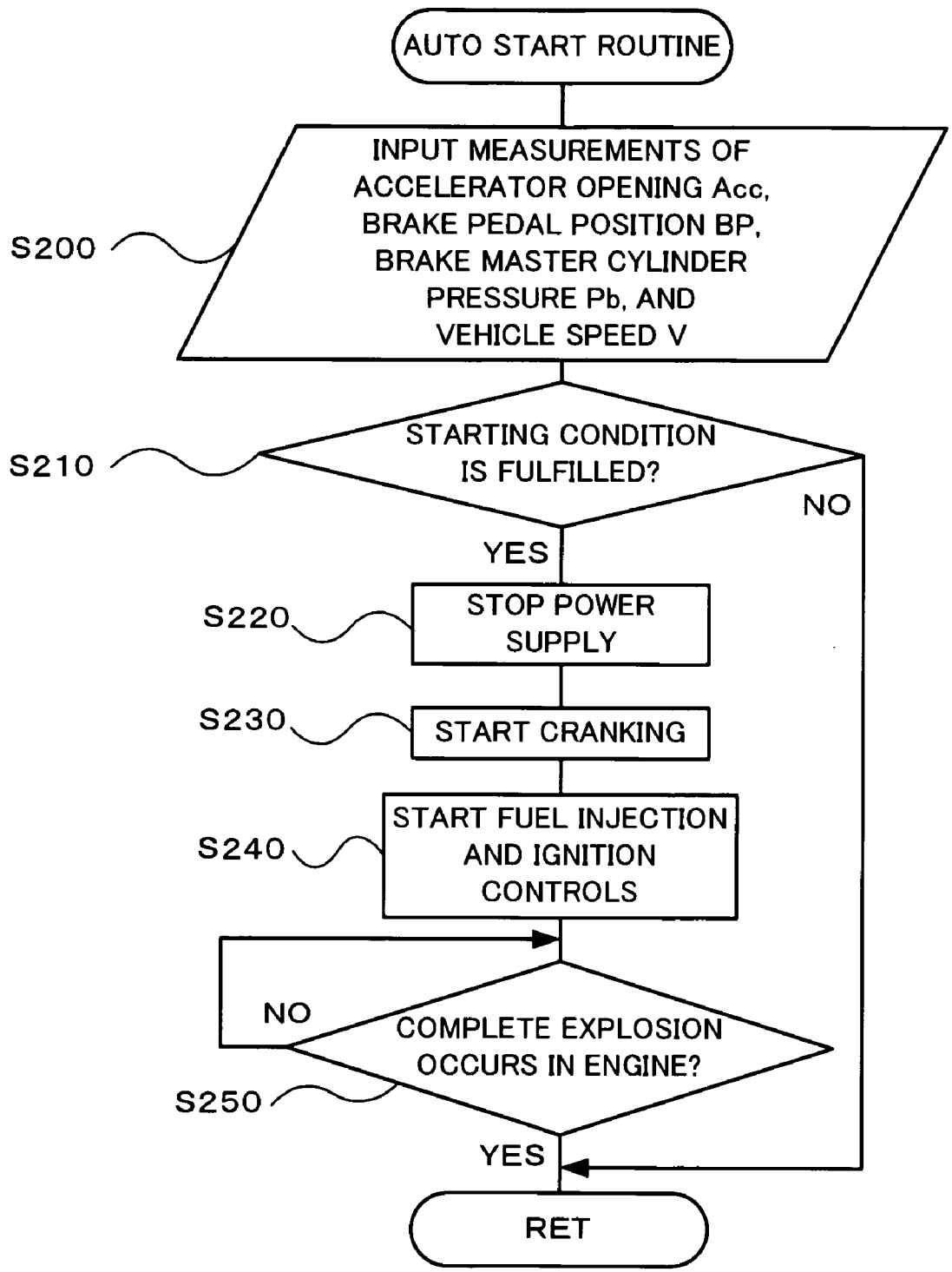
FIG. 3 is a flowchart showing an auto start routine executed by the controller in the first embodiment.

The engine system 20 also executes an auto start control to start the engine 22 in the state of an idle stop. FIG. 3 is a flowchart showing an auto start routine executed by the controller 70. The CPU 72 of the controller 70 first receives the measurements of the accelerator opening Acc, the brake pedal position BP, the brake master cylinder pressure Pb, and the vehicle speed V (step S200), and determines whether a starting condition of the engine 22 is fulfilled, based on the input measurement data (step S210). The starting condition of the engine 22 represents a failure to fulfill any of the idle stop conditions discussed above. In the event of failure to fulfill the starting condition of the engine 22, the CPU 72 immediately exits from this auto start routine.

In the event of success to fulfill the starting condition of the engine 22, on the other hand, the CPU 72 stops the power supply to the electromagnet 44 (step S220), releases the hold of the crankshaft 38 to start cranking (step S230), and starts the fuel injection control and the ignition control (step S240) to start the engine 22. On confirmation of complete explosion in the engine 22 (step S250), the CPU 72 determines that the start of the engine 22 has been completed and exits from this auto start routine.

As described above, the engine system 20 of the first embodiment executes the engine stop control to hold the crankshaft 38 at the specific rotational position of ensuring good startability of the engine 22. This arrangement ensures a quick restart of the engine 22. The electromagnet 44 attached to the crank casing 46 and the projection 42 formed on part of the counterweight 40 constitute the space-saving internal combustion engine stop mechanism. The engine system 20 supplies electric power to the electromagnet 44 to stop the rotation of the crankshaft 38 and hold the crankshaft 38 at the specific rotational position when the rotational state of the crankshaft 38 is immediately before a full stop. This arrangement desirably reduces the required size of the electromagnet 44 and saves the power consumption, compared with a mechanism of supplying electric power to stop the rotation of the crankshaft and hold the crankshaft at the specific rotational position when the crankshaft has a greater rotational speed or with a mechanism of turning the crankshaft to the specific rotational position after a full stop of the crankshaft.

The engine system 20 of the first embodiment supplies electric power to the electromagnet 44 to stop the rotation of the crankshaft 38 and hold the crankshaft 38 at the specific rotational position when the engine 22 has the revolution speed immediately before a full stop. One possible modification may supply electric power to the electromagnet 44 to stop the rotation of the crankshaft 38 and hold the crankshaft 38 at the specific rotational position when the engine 22 has a greater revolution speed than the revolution speed immediately before a full stop. The engine system 20 of the first embodiment supplies electric power to the electromagnet 44 when the measured crank angle θ enters the range between the threshold values θ1 and θ2. This range is, however, not restrictive at all and may be modified to a wider range or a narrower range.

(2) Second Embodiment

A second embodiment of the invention regards an engine system 20B constructed as a drive system including an internal combustion engine stop mechanism and an internal combustion engine auto stop start mechanism. The engine system 20B of the second embodiment has a similar structure to that of the engine system 20 of the first embodiment shown in FIG. 1, except some differences. The engine system 20B of the second embodiment additionally has a holder mechanism 100 that is mounted on the crankshaft 38 and turns and holds the crankshaft 38 to a specific rotational position of ensuring good startability of the engine 22 after a full stop of the engine 22 and a resulting full stop of the crankshaft 38, while omitting the projection 42 formed on the counterweight 40 attached to the crankshaft 38 and the electromagnet 44 attached to the crank casing 46 from the structure of the first embodiment. The like elements in the engine system 20B of the second embodiment to those in the engine system 20 of the first embodiment are expressed by the like numerals and are not specifically described here.

Figure 4:
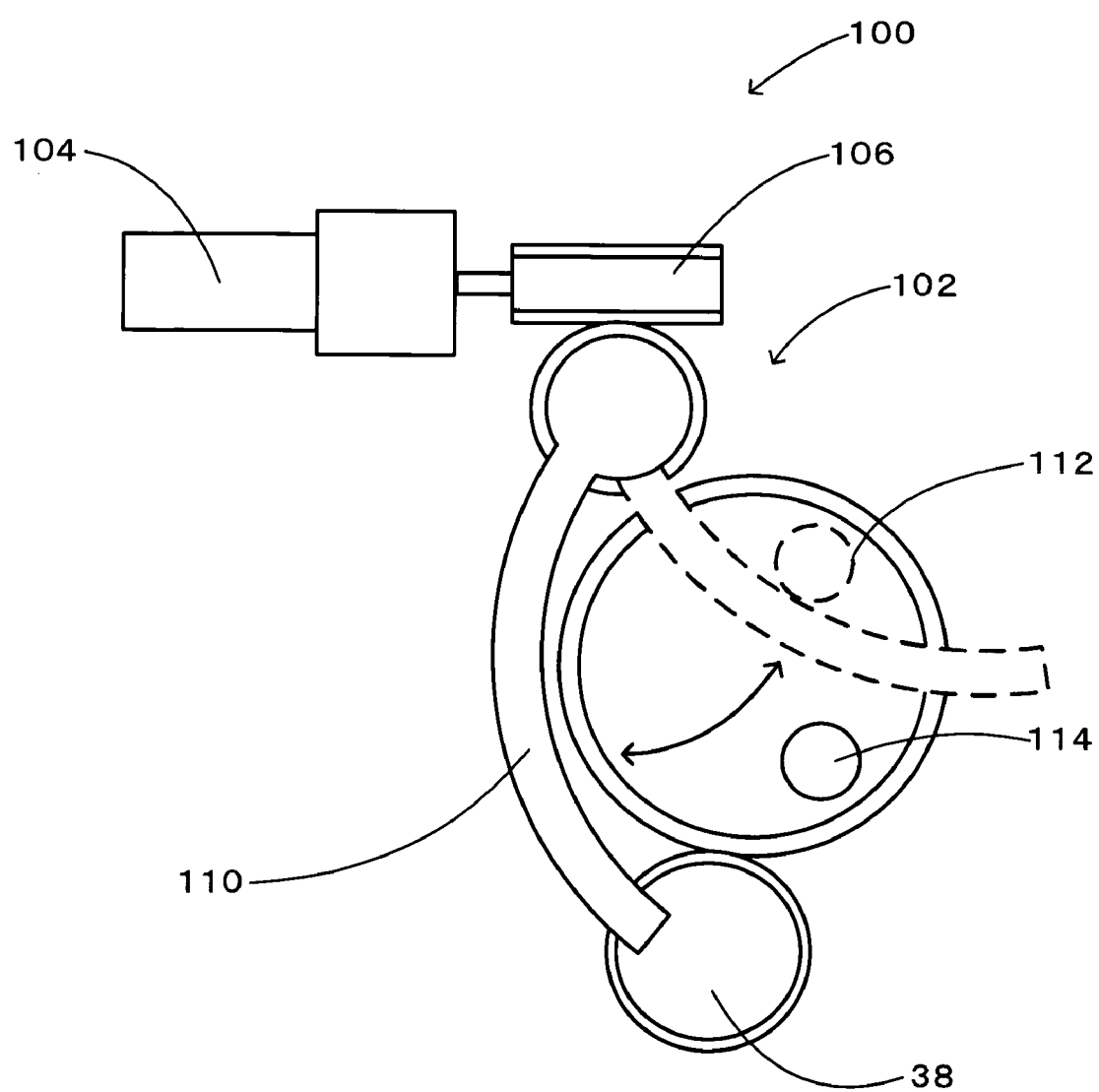
FIG. 4 schematically illustrates the structure of a holder mechanism included in an engine system of a second embodiment of the invention.

FIG. 4 schematically illustrates the structure of the holder mechanism 100 included in the engine system 20B of the second embodiment. The holder mechanism 100 of the second embodiment includes a motion conversion mechanism 102 to convert the rotational motion of the crankshaft 38 into the reciprocating motion of an arm member 110, and a motor 104 as an actuator to drive the motion conversion mechanism 102. The motion conversion mechanism 102 includes a rotation amount adjustment gear 112 that is gear-coupled with the crankshaft 38 to convert two turns of the crankshaft 38 into one turn, the arm member 110 that comes into contact with a pin 114 located at an eccentric position from the rotational axis of the rotation amount adjustment gear 112 and converts the revolving motion of the pin 114 accompanied by the rotation of the rotation motion adjustment gear 112 into a reciprocating swing motion, and a worm gear 106 that is gear-coupled with the rotation center of the arm member 110 and is driven by the motor 104. The rotation amount adjustment gear 112 is attached to the crankshaft 38 to hold the crankshaft 38 at a specific rotational position of ensuring good startability of the engine 22, when the pin 114 is pressed by the arm member 110 to a position shown by the broken line in FIG. 4. The motor 104 is under drive control of the controller 70.

The holder mechanism 100 and the controller 70 of driving and controlling the holder mechanism 100 constitute the internal combustion engine stop mechanism. The diversity of sensors and the controller 70 of controlling an auto stop and an auto start of the engine 22 based on the measurement signals from the diversity of sensors constitute the internal combustion engine auto stop start mechanism.

In the holder mechanism 100, prior to a start of the engine 22, the motor 104 is driven to adjust the position of the arm member 110 to a position shown by the solid line in FIG. 4, in order to prevent the arm member 110 from interfering with the smooth rotation of the rotation amount adjustment gear 112. The holder mechanism 100 drives the motor 104 to turn the arm member 110 from the position shown by the solid line to a position shown by the broken line in FIG. 4, when the engine 22 stops operation and the rotation of the crankshaft 38 is at a full stop. The arm member 110 comes into contact with the pin 114 of the rotation amount adjustment pin 112 in the course of the turn to the position shown by the broken line. This rotates the rotation amount adjustment gear 112 and moves the pin 114 to the position shown by the broken line in FIG. 4. As mentioned above, in combination with the motion of the pin 114 to the position shown by the broken line, the crankshaft 38 is turned to the specific rotational position of ensuring good startability of the engine 22. The holder mechanism 100 stops the operation of the motor 104 in this state and thereby holds the crankshaft 38 at this specific rotational position.

Figure 5:
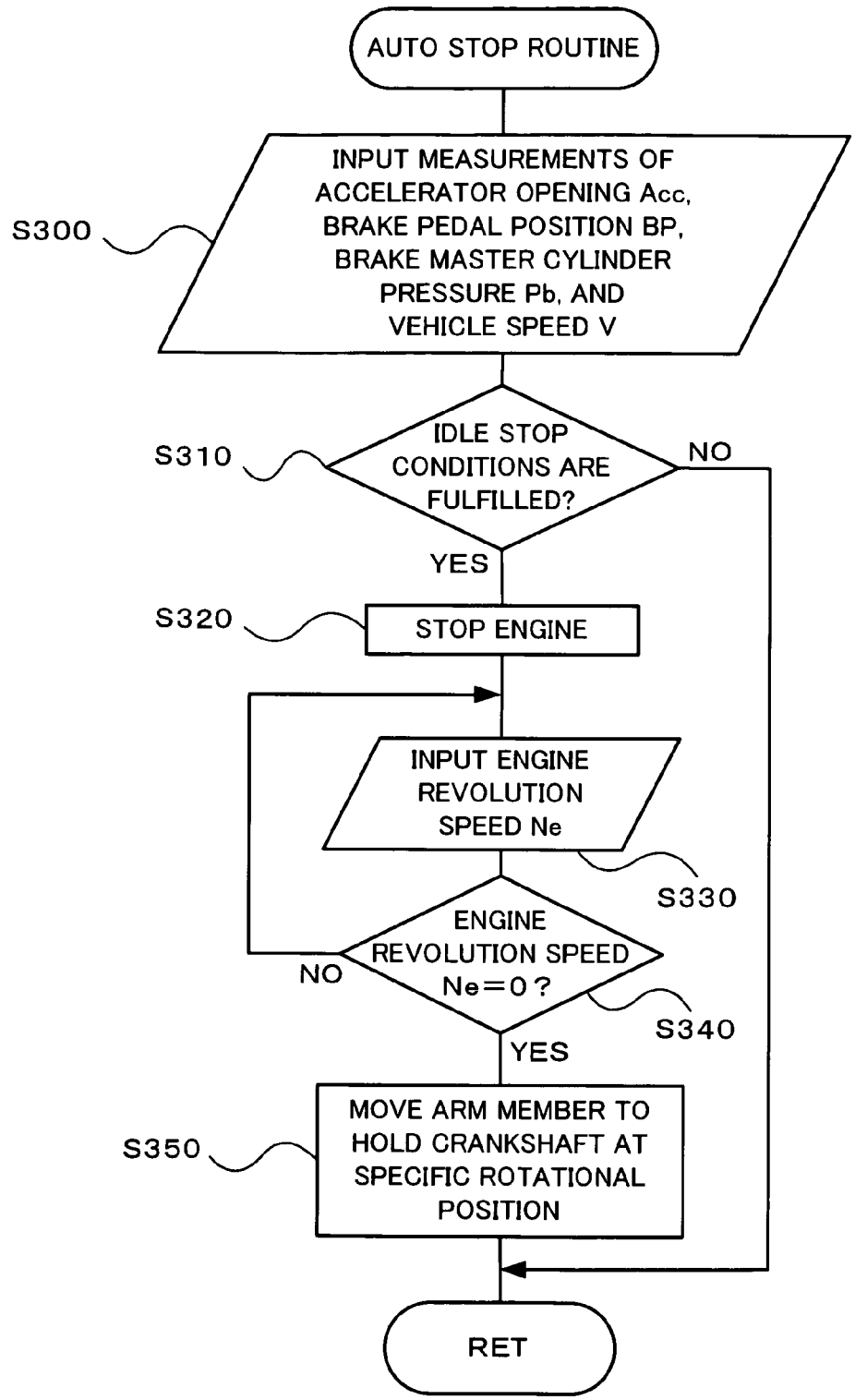
FIG. 5 is a flowchart showing an auto stop routine executed by the controller in the second embodiment.

The engine system 20B of the second embodiment executes an auto stop control and an auto start control of the engine 22. FIG. 5 is a flowchart showing an auto stop routine executed in the second embodiment. The processing of steps S300 to S320 in the auto stop routine of the second embodiment is identical with the processing of steps S100 to S120 in the auto stop routine of the first embodiment shown in the flowchart of FIG. 2 and is thus not specifically described here. Stop of the engine 22 at step S320 is equivalent to stop of the fuel injection control and the ignition control at step S120 of the first embodiment.

In the auto stop routine of the second embodiment, in the event of success to fulfill the idle stop conditions at step S310, the CPU 72 stops the engine 22 (step S320) and waits until the level of engine revolution speed Ne reaches a value '0' (steps S330 and S340). When the engine revolution speed Ne reaches zero, the CPU 72 drives the motor 104 to move the arm member 110 to the position shown by the broken line in FIG. 4, that is, the operation end position of the arm member 110 (step S350) and exits from this auto stop routine. The system of the second embodiment turns and holds the crankshaft 38 to the specific rotational position of ensuring good startability of the engine 22.

Figure 6:
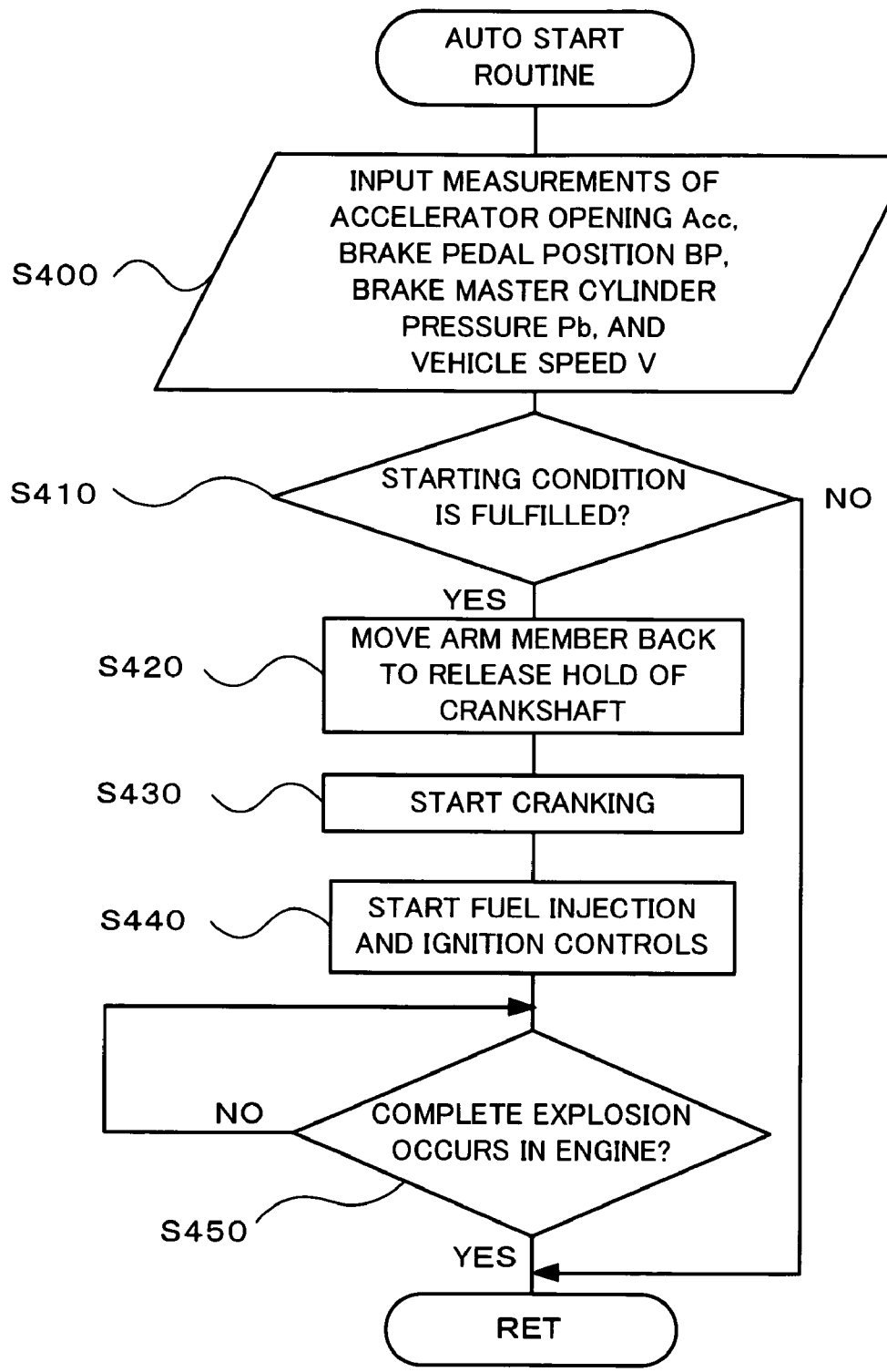
FIG. 6 is a flowchart showing an auto start routine executed by the controller in the second embodiment.

FIG. 6 is a flowchart showing an auto start routine executed in the second embodiment. The auto start routine of the second embodiment is identical with the auto start routine of the first embodiment shown in the flowchart of FIG. 3, except that the processing of step S420 replaces the processing of step S220. In the auto start routine of the second embodiment, in the event of success to fulfill the starting condition at step S410, the motor 104 is driven to move the arm member 110 back to the position shown by the solid line in FIG. 4 (step S420) and thereby release the hold the crankshaft 38, prior to start of cranking and start of the engine 22 (steps S430 to S450).

As described above, the engine system 20B of the second embodiment turns and holds the crankshaft 38 to the specific rotational position of ensuring good startability of the engine 22 after a full stop of the engine 22. This arrangement ensures a quick restart of the engine 22. The holder mechanism 100 is attached directly to the crankshaft 38. This desirably reduces the total size of the holder mechanism 100. The arrangement of the second embodiment does not require any additional power consumption to hold the turned crankshaft 38 at the specific rotational position of ensuring good startability of the engine 22, thus desirably saving power consumption.

The engine system 20B of the second embodiment reversely rotates the motor 104 to move the arm member 110 back and thereby release the hold of the crankshaft 38, prior to start of cranking to start the engine 22. One possible modification may move the arm member 110 in an axial direction to decouple the arm member 110 from the pin 114 and thereby release the hold of the crankshaft 38, prior to start of cranking to start the engine 22.

Figure 7:
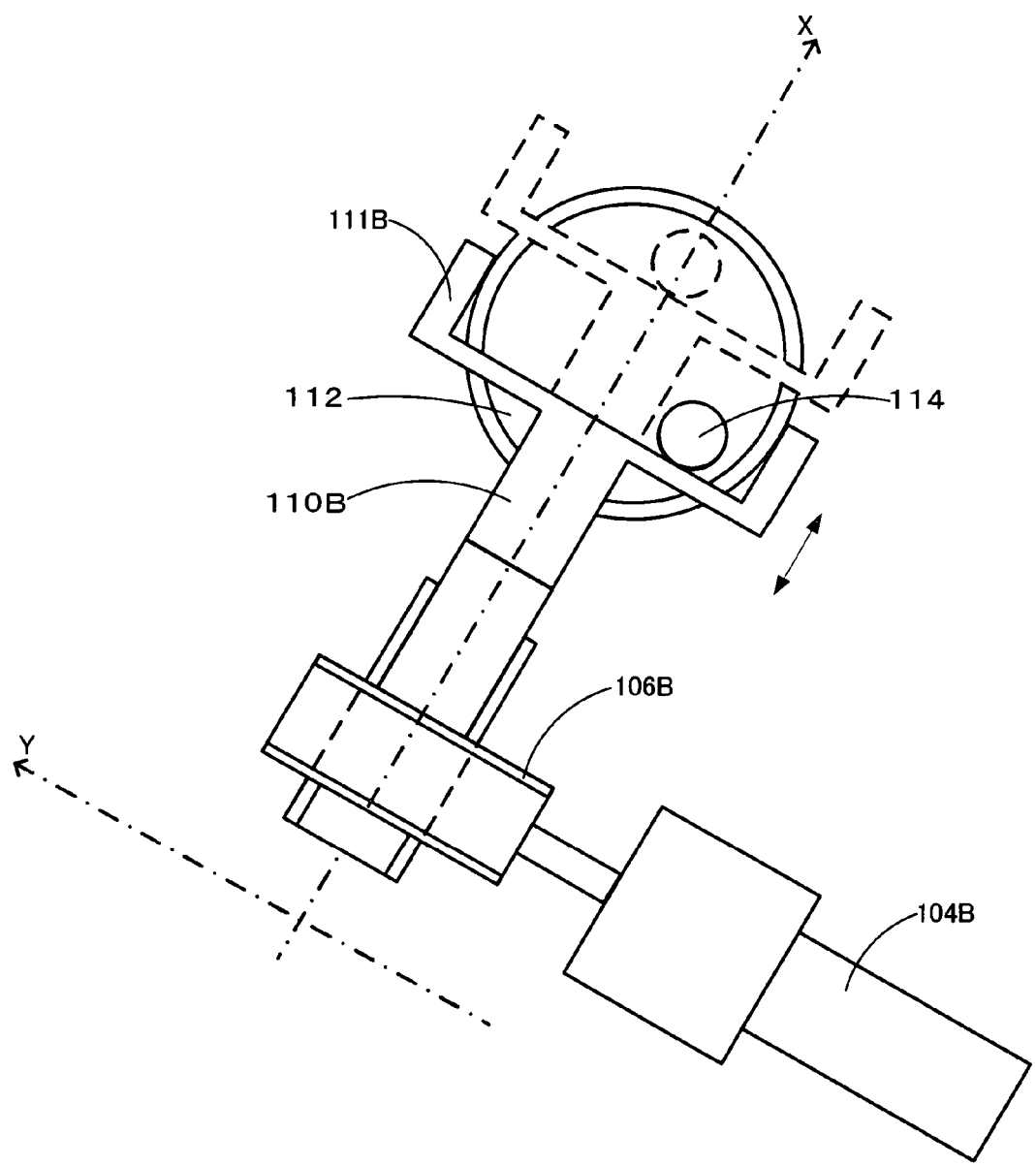
FIG. 7 shows a modified structure of the holder mechanism of the second embodiment.

In the engine system 20B of the second embodiment, the holder mechanism 100 is designed to convert the revolving motion of the pin 114 of the rotation amount adjustment gear 112 into the reciprocating swing motion of the arm member 110. The design of the holder mechanism may be modified in diverse ways according to the requirements, as long as the holder mechanism is capable of converting the rotational motion of the crankshaft 38 into a reciprocating motion and one end of the reciprocating motion represents the specific rotational position of the crankshaft 38 that ensures good startability of the engine 22. In one modified structure shown in FIG. 7, the holder mechanism includes a U-shaped member 111B that is formed to allow the pin 114 of the rotation amount adjustment gear 112 to move back and forth in the direction of a y axis, an axial member 110B that is arranged on an x axis, which runs through the rotation center of the rotation amount adjustment gear 112 and is perpendicular to the y axis, and is extended from the center portion of the U-shaped member 111B, a worm bear 106B that shifts the axial member 110B in the direction of the x axis, and a motor 104B as an actuator that drives and rotates the worm gear 106B in both normal and reverse directions.

In the holder mechanism 100 included in the engine system 20B of the second embodiment, the rotation amount adjustment gear 112 is designed to convert two turns of the crankshaft 38 into one turn. The design of the rotation amount adjustment gear 112 may be modified in various ways as long as one end of the reciprocating motion of the pin 114 represents a specific rotational position that ensures good startability of any cylinder of the engine 22. In the case of a 4-cylinder engine having four cylinders arranged with a phase shift of 180 degrees, the rotation amount adjustment gear 112 may be designed to convert an integral multiple of ½ turn of the crankshaft 38 into one turn. In the case of a 6-cylinder engine having six cylinders arranged with a phase shift of 120 degrees, the rotation amount adjustment gear 112 may be designed to convert an integral multiple of ⅓ turn of the crankshaft 38 into one turn.

In the engine system 20B of the second embodiment, the auto stop control activates the holder mechanism 100 to move and hold the crankshaft 38 to the specific rotational position of ensuring good startability of the engine 22 after a full stop of the crankshaft 38. The auto start control activates the holder mechanism 100 to release the hold of the crankshaft 38 at the specific rotational position, prior to start of the engine 22. One modified structure combines the holder mechanism 100 of the second embodiment with alignment of the projection 42 formed on the counterweight 40 attached to the crankshaft 38 with the electromagnet 44 attached to the crank casing 46 as described in the first embodiment. The auto stop control of this modified structure activates the holder mechanism 100 to move the crankshaft 38 to the specific rotational position of ensuring good startability of the engine 22 after a full stop of the crankshaft 38. The auto stop control then immediately starts supply of electric power to the electromagnet 44 to hold the crankshaft 38 at the specific rotational position, and releases the hold of the crankshaft 38 by means of the holder mechanism 100 immediately after start of the electromagnetic attraction of the electromagnet 44. The auto start control of this modified structure stops the power supply to the electromagnet 44 to release the hold of the crankshaft 38 at the specific rotational position, prior to start of the engine 22. The arrangement of this modified structure moves the crankshaft 38 to the specific rotational position of ensuring good startability of the engine 22 after a full stop of the crankshaft 38, while ensuring a quick restart of the engine 22.

(3) Third Embodiment

Figure 8:
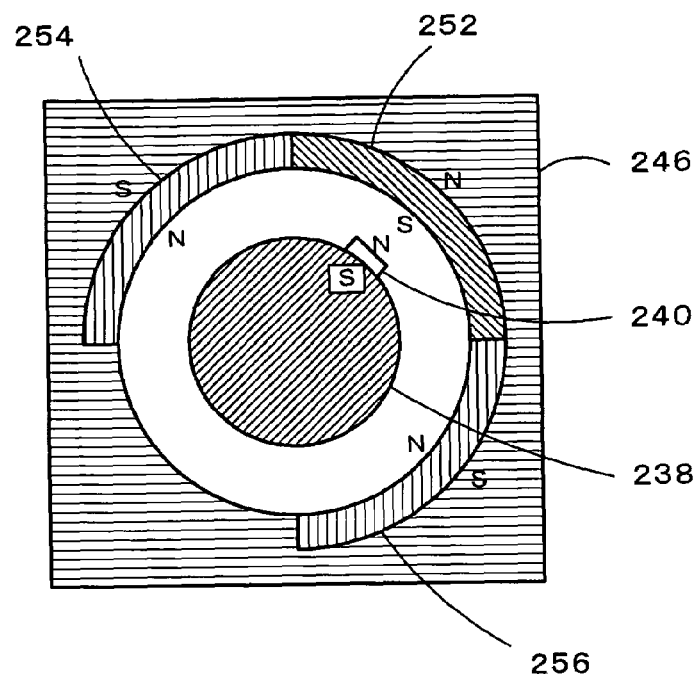
FIG. 8 schematically illustrates the structure of a crankshaft and a crank casing included in an engine system of a third embodiment of the invention.

A third embodiment of the invention regards an engine system 20C constructed as a drive system including an internal combustion engine stop mechanism and an internal combustion engine auto stop start mechanism. FIG. 8 schematically illustrates the structure of a crankshaft 238 and a crank casing 246 included in the engine system 20C of the third embodiment. As illustrated, the engine system 20C of the third embodiment includes a permanent magnet 240 attached to the crankshaft 238, as well as three arc-shaped (about 90 degrees) permanent magnets 252, 254, and 256 set on the inner wall of the crank casing 246. The permanent magnet 252 is arranged to be aligned with and face the permanent magnet 240 attached to the crankshaft 238 when the crankshaft 238 is located at a specific rotational position of ensuring good startability of the engine 22. The permanent magnet 252 is magnetized to have magnetic polarity 'S' on its one side facing the crankshaft 238, while an opposed side of the permanent magnet 240 facing the crank casing 246 is magnetized to have opposite magnetic polarity 'N'. The permanent magnets 254 and 256 are arranged at positions rotated counterclockwise and clockwise about the crankshaft 238 by approximately 90 degrees from the position of the permanent magnet 252. The permanent magnets 254 and 256 are magnetized to have the magnetic polarity 'N' on the respective sides facing the crankshaft 238, which is identical with the magnetic polarity 'N' on the opposed side of the permanent magnet 240 facing the crank casing 246.

The description now regards operations of the engine system 20C of the third embodiment constructed as discussed above. In the engine system 20C of the third embodiment, in the process of stopping the engine 22, the permanent magnet 240 on the crankshaft 238 produces an attractive force to the permanent magnet 252, while producing a repulsive force against the permanent magnets 254 and 256. The engine 22 is accordingly stopped to hold the permanent magnet 240 at the position aligned with the permanent magnet 252 (that is, at the position of FIG. 8). This alignment position represents the specific rotational position of ensuring good startability of the engine 22 as mentioned above. This arrangement thus ensures a quick restart of the engine 22.

As described above, the engine system 20C of the third embodiment has the permanent magnet 240 attached to the crankshaft 238, as well as the three permanent magnets 252, 254, and 256 set on the crank casing 246. The permanent magnet 252 is arranged to be aligned with and face the permanent magnet 240 on the crankshaft 238 when the crankshaft 238 is located at the specific rotational position of ensuring good startability of the engine 22. The permanent magnet 252 is magnetized to have the opposite magnetic polarity on its one side facing the crankshaft 238 to the magnetic polarity on the opposed side of the permanent magnet 240 facing the crank casing 246. The permanent magnets 254 and 256 are arranged at positions rotated respectively counterclockwise and clockwise about the crankshaft 238 by approximately 90 degrees from the position of the permanent magnet 252. The permanent magnets 254 and 256 are magnetized to have the identical magnetic polarity on the respective sides facing the crankshaft 238 with the magnetic polarity on the opposed side of the permanent magnet 240 facing the crank casing 246. This arrangement does not require any specific control but desirably stops and holds the crankshaft 238 at the specific rotational position of ensuring good startability of the engine 22. This accordingly ensures a quick restart of the engine 22. The internal combustion engine auto stop start mechanism is also applicable to the structure of the engine system 20C of the third embodiment.

Figure 9:
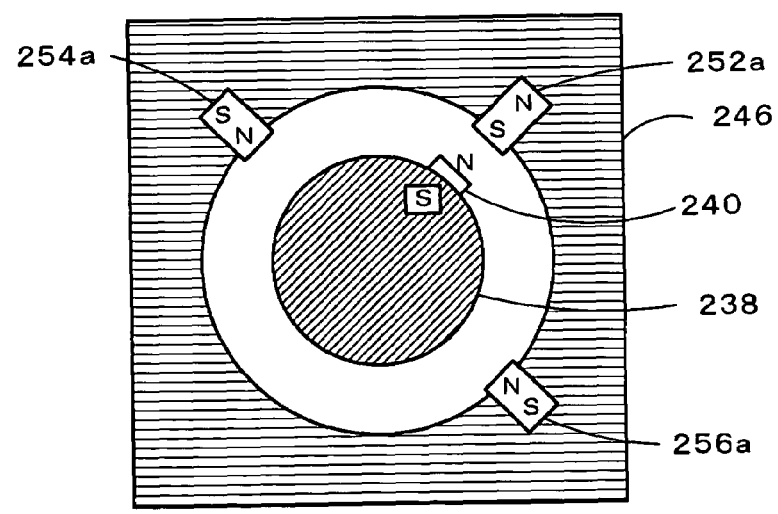
FIG. 9 shows a modified structure of the crankshaft and the crank casing.

The engine system 20C of the third embodiment has the three arc-shaped (about 90 degrees) permanent magnets 252 to 256 set on the crank casing 246 as shown in FIG. 8. The three permanent magnets 252 to 256 may be replaced by permanent magnet bars 252a to 256a attached to the crank casing 246 as shown in FIG. 9.

The three arc-shaped permanent magnets 252 to 256 set on the crank casing 246 in the engine system 20C of the third embodiment may also be replaced by three electromagnets located at the corresponding positions and magnetized to have the corresponding magnetic poles. This modified structure may adopt the auto stop routine shown in the flowchart of FIG. 2 and the auto start routine shown in the flowchart of FIG. 3 to start and stop the power supply to the electromagnets. The auto stop control supplies electric power to the electromagnets to stop and hold the crankshaft 238 at the specific rotational position of ensuring good startability of the engine 22. The auto start control stops the power supply to the electromagnets to eliminate the electromagnetic attraction of the electromagnets, prior to start of the engine 22. This also ensures the good startability of the engine 22.

The engine system 20C of the third embodiment has the three permanent magnets 252 to 256 set on the crank casing 246. Another possible modification may omit the permanent magnets 254 and 256 from the engine system 20C.

In the engine systems 20, 20B, and 20C of the first through the third embodiments and their modifications discussed above, the technique of the invention is applied to the idle stop control of the engine in the automobile to stop and hold the crankshaft at the specific rotational position of ensuring good startability of the engine. The technique of the invention is also applicable to a stop control of an engine working in an intermittent manner in a hybrid vehicle or to an ordinary engine stop control in response to an off operation of an ignition switch. In the stop control of the engine working in the intermittent manner in the hybrid vehicle, it is not necessary to stop and hold the crankshaft at the specific rotational position of ensuring good startability of the engine. The crankshaft may be stopped and held, for example, at another rotational position that enables the engine to quickly transit a resonance frequency range in the course of motoring the engine for a restart. In the ordinary stop control, the hold of the crankshaft at the specific rotational position is required until disappearance of the pressure in the combustion chamber of the engine to cause a rotational shift of the crankshaft.

(4) Fourth Embodiment

Figure 10:
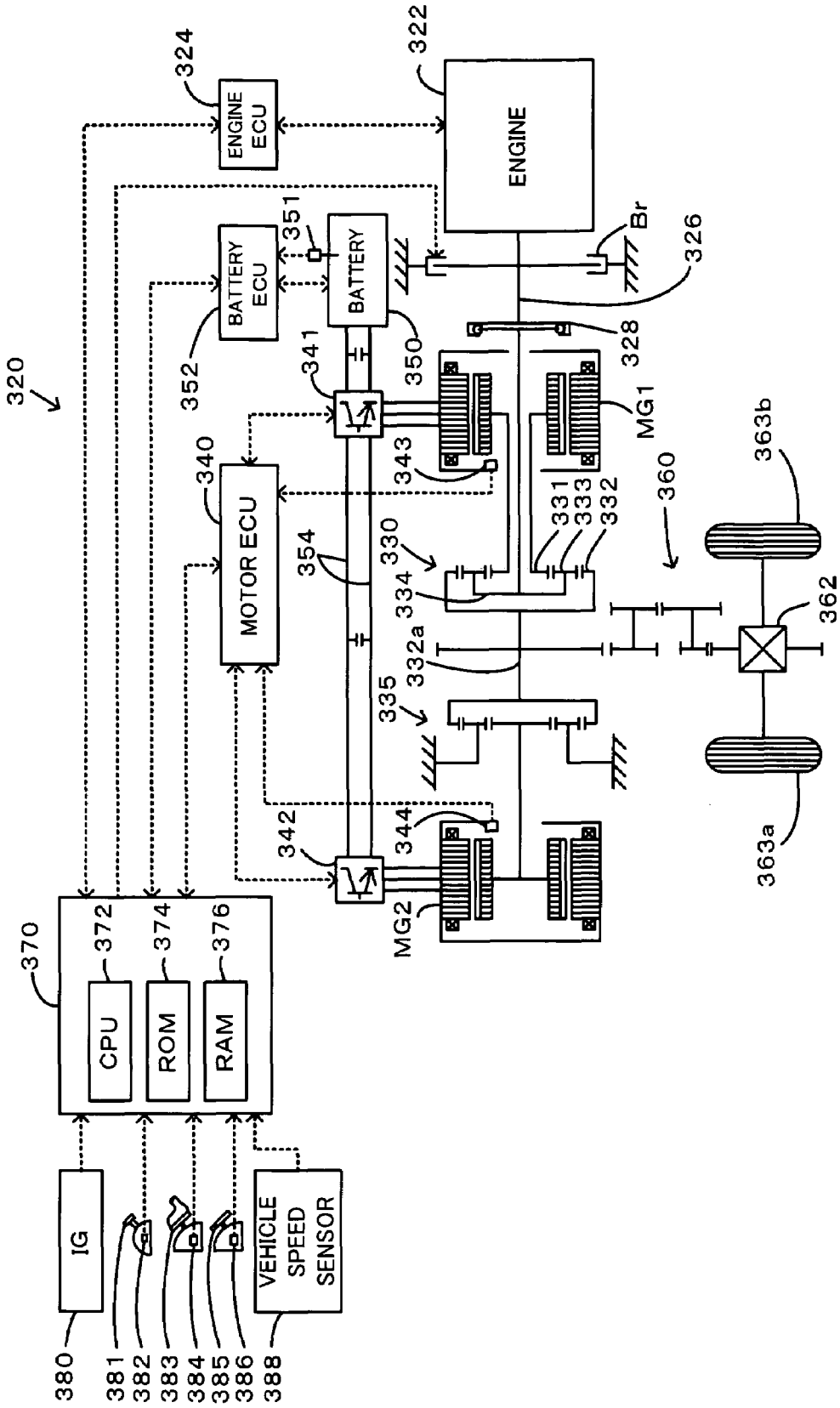
FIG. 10 schematically illustrates the configuration of a hybrid vehicle in a fourth embodiment of the invention.

A fourth embodiment of the invention regards a hybrid vehicle 320 with a drive system of the invention mounted thereon. FIG. 10 schematically illustrates the configuration of the hybrid vehicle 320 in the fourth embodiment of the invention. As illustrated, the hybrid vehicle 320 of the fourth embodiment includes an engine 322, a brake Br that is attached to a crankshaft 326 or an output shaft of the engine 322 and is capable of applying a frictional force to brake the crankshaft 326, a three shaft-type power distribution integration mechanism 330 that is linked to the crankshaft 326 of the engine 322 via a damper 328, a motor MG1 that is connected with the power distribution integration mechanism 330 and is capable of generating electric power, a reduction gear 335 that is set on a ring gear shaft 332a as a drive shaft linked to the power distribution integration mechanism 330, a motor MG2 that is connected with the reduction gear 335, and a hybrid electronic control unit 370 that controls the operations of the whole drive system.

The engine 322 is an internal combustion engine that consumes a supply of a hydrocarbon fuel, such as gasoline or light oil, to output power and is under operation control of an engine electronic control unit (hereafter referred to as engine ECU) 324. The engine ECU 324 receives input signals from diverse sensors that detect and measure the operating conditions of the engine 322 and executes the operation control including fuel injection control, ignition control, and air intake regulation. The engine ECU 324 communicates with the hybrid electronic control unit 370 and controls the operations of the engine 322 in response to control signals sent from the hybrid electronic control unit 370, while outputting data regarding the operating conditions of the engine 322 to the hybrid electronic control unit 370 according to the requirements.

The power distribution integration mechanism 330 includes a sun gear 331 as an external gear, a ring gear 332 as an internal gear that is arranged concentrically with the sun gear 331, multiple pinion gears 333 that engage with the sun gear 331 and with the ring gear 332, and a carrier 334 that holds the multiple pinion gears 333 to allow both their rotations and revolutions on respective axes. The power distribution integration mechanism 330 is constructed as a planetary gear mechanism having the sun gear 331, the ring gear 332, and the carrier 334 as rotational elements of differential motions. In the power distribution integration mechanism 330, the carrier 334 is linked to the crankshaft 326 of the engine 322, the sun gear 331 is linked to the motor MG1, and the rig ear gear 332 is linked to the reduction gear 335 via the ring gear shaft 332a. When the motor MG1 functions as a generator, the power of the engine 322 input via the carrier 334 is distributed into the sun gear 331 and the ring gear 332 corresponding to the gear ratio of the sun gear 331 to the ring gear 332. When the motor MG1 functions as a motor, the power of the engine 322 input via the carrier 334 is integrated with the power of the motor MG1 input via the sun gear 331, and the integrated total power is output to the ring gear 332. The power output to the ring gear 332 goes through the ring gear shaft 332a, a gear mechanism 360, and a differential gear 362 and is eventually output to drive wheels 363a and 363b of the vehicle.

The motors MG1 and MG2 are known synchronous motor generators having functions of both a generator and a motor, and transmit electric power to and from a battery 350 via inverters 341 and 342. Power lines 354 of connecting the inverters 341 and 342 with the battery 350 are designed as a positive electrode common bus and a negative electrode common bus commonly used by the inverters 341 and 342. The power lines 354 allow the electric power generated by one of the motors MG1 and MG2 to be consumed by the other of the motors MG1 and MG2. The battery 350 is accordingly charged with an excess of electric power generated by either of the motors MG1 and MG2, while being discharged to compensate for an insufficiency of electric power generated by either of the motors MG1 and MG2. The battery 350 is neither charged nor discharged under the electric power balance of the motors MG1 and MG2. Both the motors MG1 and MG2 are under operation control of a motor electronic control unit (hereafter referred to as motor ECU) 340. The motor ECU 340 receives input signals required for the operation control of the motors MG1 and MG2, for example, detection signals representing rotational positions of respective rotors of the motors MG1 and MG2 from rotational position detection sensors 343 and 344 and measurements of phase currents applied to the motors MG1 and MG2 from electric current sensors (not shown). The motor ECU 340 outputs switching control signals to the inverters 341 and 342. The motor ECU 340 communicates with the hybrid electronic control unit 370 and controls the operations of the motors MG1 and MG2 in response to control signals sent from the hybrid electronic control unit 370, while outputting data regarding the operating conditions of the motors MG1 and MG2 to the hybrid electronic control unit 370 according to the requirements.

The battery 350 is under control of a battery electronic control unit (hereafter referred to as battery ECU) 352. The battery ECU 352 receives input signals required for the control of the battery 350, for example, a measurement of inter-terminal voltage from a voltage sensor (not shown) located between terminals of the battery 350, charge-discharge electric currents from an electric current sensor (not shown) located in the power lines 354 linked to the output terminal of the battery 350, and a measurement of battery temperature Tb from a temperature sensor 351 attached to the battery 350. The battery ECU 352 outputs data regarding the state of the battery 350 to the hybrid electronic control unit 370 via communication according to the requirements. The battery ECU 352 calculates a state of charge (SOC) from the accumulated charge-discharge electric currents measured by the electric current sensor (not shown) for control of the battery 350.

The hybrid electronic control unit 370 is constructed as a microcomputer including a CPU 372, a ROM 374 that stores processing programs, a RAM 376 that temporarily stores data, input and output ports (not shown), and a communication port (not shown). The hybrid electronic control unit 370 receives, via the input port, an ignition signal sent from an ignition switch 380, a gearshift position SP or current position of a gearshift lever 381 detected by and sent from a gearshift position sensor 382, an accelerator opening Acc corresponding to the driver's step-on amount of an accelerator pedal 383 sensed by and sent from an accelerator pedal position sensor 384, a brake pedal position BP corresponding to the driver's step-on amount of a brake pedal 385 detected by and sent from a brake pedal position sensor 386, and a vehicle speed V measured by and sent from a vehicle speed sensor 388. The hybrid electronic control unit 370 outputs driving signals to an actuator (not shown) of the brake Br via the output port. The hybrid electronic control unit 370 is connected with the engine ECU 324, the motor ECU 340, and the battery ECU 352 via the communication port and transmits various control signals and data to and from the engine ECU 324, the motor ECU 340, and the battery ECU 352.

The hybrid vehicle 320 of the fourth embodiment calculates a torque demand to be output to the ring gear shaft 332a or the drive shaft from the measurements of the vehicle speed V and the accelerator opening Acc corresponding to the driver's step-on amount of the accelerator pedal 383, and controls the operations of the engine 322 and the motors MG1 and MG2 to output a required level of power corresponding to the calculated torque demand to the ring gear shaft 332a. The operation control of the engine 322 and the motors MG1 and MG2 selectively effectuates one of a torque conversion drive mode, a charge-discharge drive mode, and a motor drive mode. The torque conversion drive mode controls the operations of the engine 322 to output a quantity of power equivalent to the required level of power, while driving and controlling the motors MG1 and MG2 to cause all the power output from the engine 322 to be subjected to torque conversion by means of the power distribution integration mechanism 330 and the motors MG1 and MG2 and output to the ring gear shaft 332a. The charge-discharge drive mode controls the operations of the engine 322 to output a quantity of power equivalent to the sum of the required level of power and a quantity of electric power consumed by charging the battery 350 or supplied by discharging the battery 350, while driving and controlling the motors MG1 and MG2 to cause all or part of the power output from the engine 322 equivalent to the required level of power to be subjected to torque conversion by means of the power distribution integration mechanism 330 and the motors MG1 and MG2 and output to the ring gear shaft 332a, simultaneously with charge or discharge of the battery 350. The motor drive mode stops the operations of the engine 322 and drives and controls the motor MG2 to output a quantity of power equivalent to the required level of power to the ring gear shaft 332a.

Figure 11:
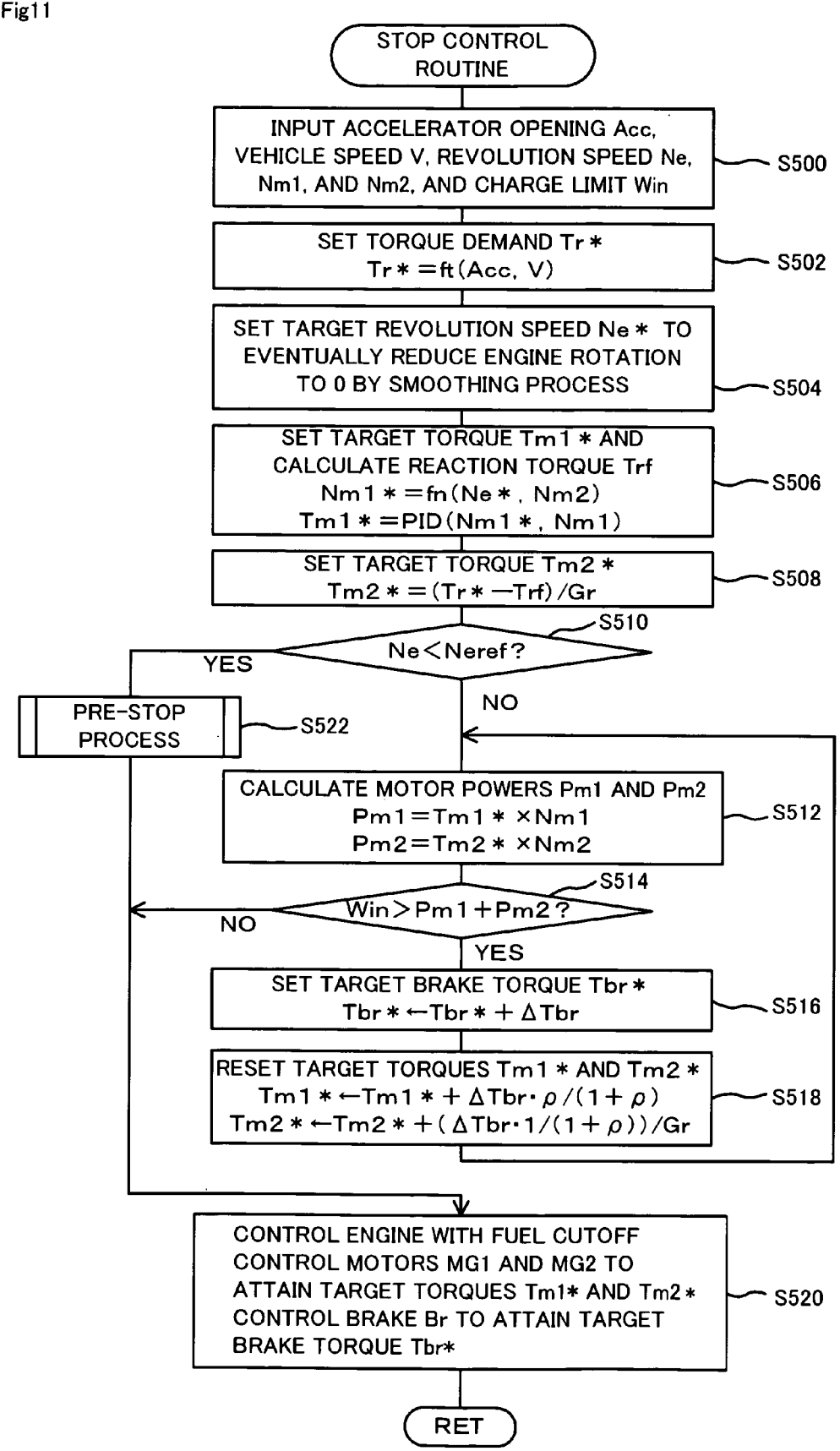
FIG. 11 is a flowchart showing a stop control routine executed by a hybrid electronic control unit included in the hybrid vehicle of the fourth embodiment.

The description regards the operations of the hybrid vehicle 320 of the fourth embodiment constructed as discussed above, especially a series of operations to stop the engine 322. FIG. 11 is a flowchart showing a stop control routine executed by the hybrid electronic control unit 370 in the hybrid vehicle 320 of the fourth embodiment. This stop control routine is triggered by a changeover command from the torque conversion drive mode or the charge-discharge drive mode to the motor drive mode to stop the operations of the engine 322 and is executed repeatedly at preset time intervals (for example, at every 8 msec).

In the stop control routine, the CPU 372 of the hybrid electronic control unit 370 first inputs various data required for control, that is, the accelerator opening Acc from the accelerator pedal position sensor 384, the vehicle speed V from the vehicle speed sensor 388, revolution speeds Nm1 and Nm2 of the motors MG1 and MG2, a revolution speed Ne of the engine 322, and a charge limit Win of the battery 350 (step S500). The revolution speeds Nm1 and Nm2 of the motors MG1 and MG2 are computed from the rotational positions of the respective rotors in the motors MG1 and MG2 detected by the rotational position detection sensors 343 and 344 and are input from the motor ECU 340 via communication. The revolution speed Ne of the engine 322 is measured by and is directly input from a revolution speed sensor (not shown). The revolution speed Ne may otherwise be calculated from the computed revolution speeds Nm1 and Nm2 and the gear ratio set in the power distribution integration mechanism 330. The charge limit Win has been set in advance corresponding to the state of charge (SOC) of the battery 350 and the measured battery temperature Tb according to a charge limit setting routine (not shown) and has been written at a specific address in the RAM 376. The CPU 372 reads the charge limit Win from the specific address in the RAM 376 at step S500. The charge limit Win has negative values in the direction of charging the battery 350.

Figure 12:
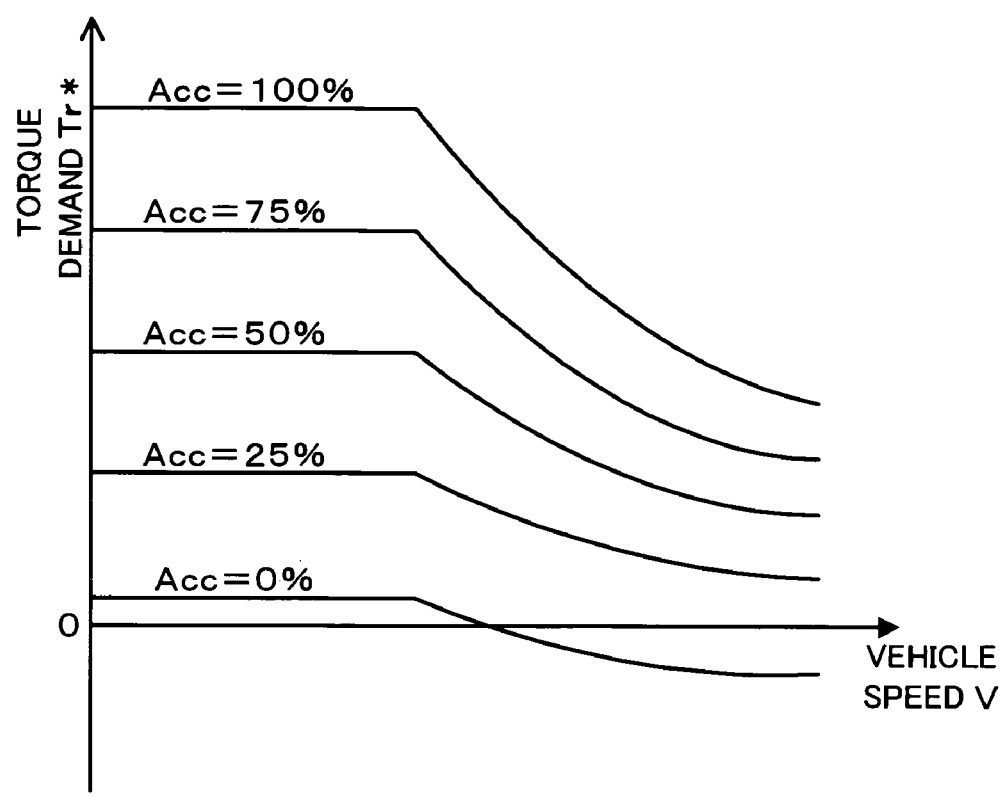
FIG. 12 shows a torque demand setting map.

After the input of these data, the CPU 372 sets a torque demand Tr* to be output to the ring gear shaft 332a or the drive shaft, based on the input accelerator opening Acc and the input vehicle speed V (step S502). Variations in torque demand Tr* against the accelerator opening Acc and the vehicle speed V have been set in advance and have been stored as a torque demand setting map in the ROM 374. The CPU 372 reads the torque demand Tr* corresponding to the given accelerator opening Acc and the given vehicle speed V from the torque demand setting map at step S502. One example of the torque demand setting map is shown in FIG. 12.

Figure 13:
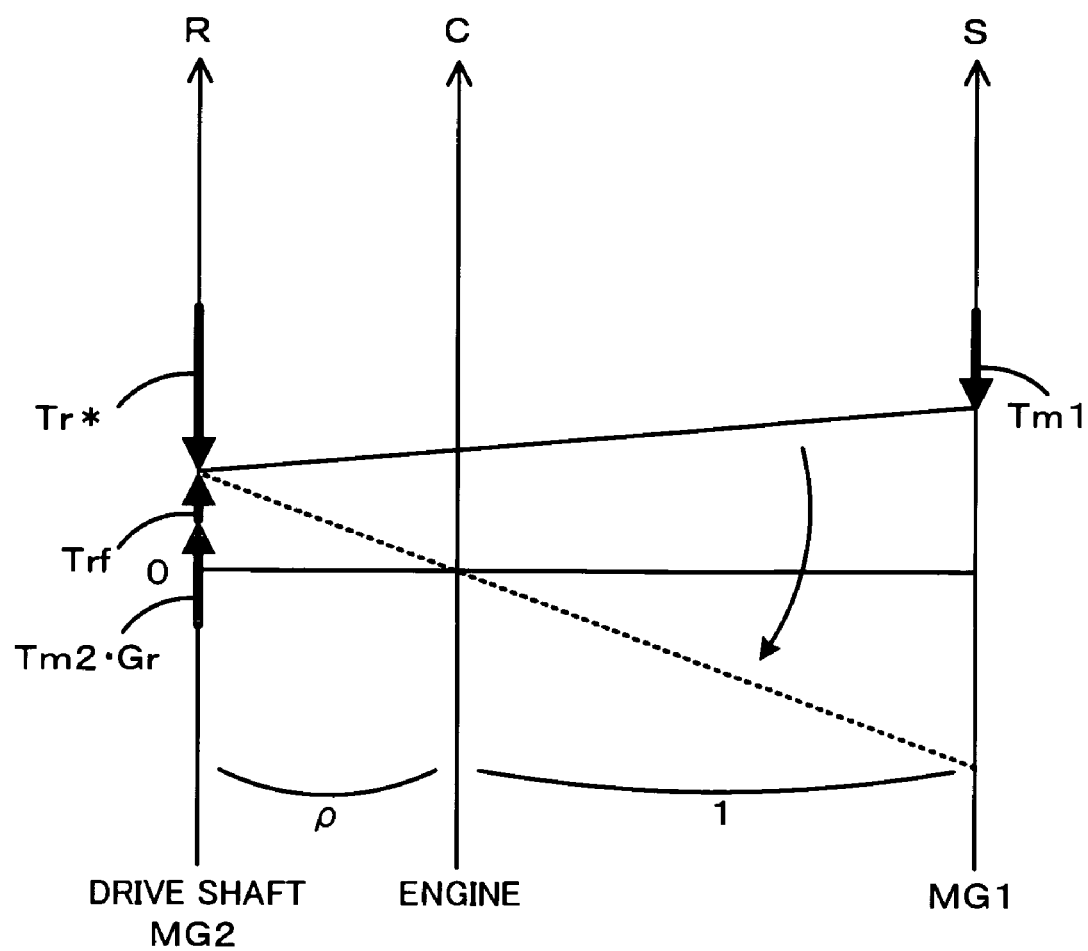
FIG. 13 is an alignment chart showing a dynamic relation of respective rotational elements included in a power distribution integration mechanism in the process of braking rotation of an engine.

The CPU 372 sets a target revolution speed Ne* of the engine 322 based on the input engine revolution speed Ne to gradually reduce the rotation of the engine 322 to zero by smoothing process or rating process (step S504). This smoothly decreases the rotation of the engine 322. At subsequent step S506, the CPU 372 sets a target revolution speed Nm1* of the motor MG1, based on the setting of the target revolution speed Ne*, the input revolution speed Nm2 of the motor MG2, a gear ratio ρ set in the power distribution integration mechanism 330 (=the ratio of the number of teeth of the sun gear 331 to the number of teeth of the ring gear 332), and a gear ratio Gr set in the reduction gear 335 (=the ratio of the revolution speed of the motor MG1 to the revolution speed of the ring gear shaft 332a). The CPU 372 also sets a target torque Tm1* to be output from the motor MG1 corresponding to the setting of the target revolution speed Nm1* and the input revolution speed Nm1 of the motor MG1, and calculates a reaction torque Trf to cancel out a torque acting on the ring gear shaft 332a against output of a torque from the motor MG1 (step S506). FIG. 13 shows a dynamic relation of the respective rotational elements in the power distribution integration mechanism 330 in the process of braking the rotation of the engine 322. Axes S, C, and R respectively show the revolution speed of the sun gear 331, the revolution speed of the carrier 334, and the revolution speed Nr of the ring gear 332. As mentioned previously, the revolution speed of the sun gear 331 is equal to the revolution speed Nm1 of the motor MG1, and the revolution speed of the carrier 334 is equal to the revolution speed Ne of the crankshaft 326 of the engine 322. The target revolution speed Nm1* of the motor MG1 is thus calculated from the revolution speed of the ring gear shaft 332a (=Nm2/Gr), the target revolution speed Ne*, and the gear ratio ρ set in the power distribution integration mechanism 330 according to Equation (1) given below. The procedure then sets the target torque Tm1* to attain rotation of the motor MG1 at the calculated target revolution speed Nm1* and controls the operations of the motor MG1. The engine 322 is accordingly rotated at the target revolution speed Ne*. The procedure of this embodiment calculates the target torque Tm1* from the setting of the target revolution speed Nm1* and the measured current revolution speed Nm1 of the motor MG1 according to Equation (2) of feedback control given below.

$$Nm1^* = \frac{Ne^* \cdot (1+\rho)}{\rho} - \frac{Nm2/Gr}{\rho} \qquad (1)$$

$$Tm1^* = \text{Previous} Tm1^* + KP(Nm1^* - Nm1) + KI \int (Nm1^* - Nm1)dt \qquad (2)$$

In Equation (2), KP in the second term on the right side represents a gain of a proportional term and KI in the third term on the right side represents a gain of an integral term. The reaction torque Trf is calculated from the gear ratio ρ set in the power distribution integration mechanism 330 and the target torque Tm1* of the motor MG1. The reaction torque Trf represents a torque required to cancel out a torque acting on the ring gear shaft 332a when a torque corresponding to the target torque Tm1* is applied to the shaft of the sun gear 331 in the power distribution integration mechanism 330.

The CPU 372 then calculates a target torque Tm2* of the motor MG2 from the preset torque demand Tr*, the calculated reaction torque Trf, and the gear ratio Gr set in the reduction gear 335 according to Equation (3) given below (step S508).

$$Tm2^* = \frac{Tr^* - Trf}{Gr} \qquad (3)$$

As clearly understood from the chart of FIG. 13, the target torque Tm2* of the motor MG2 is obtained by subtracting the reaction torque Trf from the torque demand Tr* to be output to the ring gear shaft 332a and dividing the difference by the gear ratio Gr set in the reduction gear 335.

The CPU 372 subsequently compares the revolution speed Ne of the engine 322 input at step S500 with a preset threshold value Neref (step S510). The threshold value Neref is used to determines whether the engine 322 is in a state immediately before a full stop and is set equal to, for example, 200 rpm. When the revolution speed Ne is not less than the threshold value Neref at step S510, the CPU 372 calculates motor powers Pm1 and Pm2 generated or consumed by the respective motors MG1 and MG2 according to Equations (4) and (5) given below (step S512) and compares the sum of the calculated motor powers Pm1 and Pm2 with the input charge limit Win of the battery 350 (step S514).

$$Pm1 = Tm1^* \times Nm1 \qquad (4)$$

$$Pm2 = Tm2^* \times Nm2 \qquad (5)$$

This comparison determines whether the absolute value of the sum of the calculated motor powers Pm1 and Pm2 is greater than the absolute value of the charge limit Win, that is, whether the total electric power generated by the motors MG1 and MG2 exceeds a maximum chargeable electric power of the battery 350 (step S514).

When the sum of the motor powers Pm1 and Pm2 is less than the charge limit Win, the CPU 372 sets a target brake torque Tbr* according to Equation (6) given below (step S516), and resets the target torques Tm1* and Tm2* of the motors MG1 and MG21 according to Equations (7) and (8) given below (step S518).

$$Tbr^* \leftarrow Tbr^* + \Delta Tbr \tag{6}$$

$$Tm1^* \leftarrow Tm1^* + \frac{\Delta Tbr \cdot \rho}{(1+\rho)} \tag{7}$$

$$Tm2^* \leftarrow Tm2^* + \frac{\Delta Tbr}{(1+\rho) \cdot Gr} \tag{8}$$

The processing of steps S512 to S518 is repeated until it is determined at step S514 that the sum of the calculated motor powers Pm1 and Pm2 is not less than the input charge limit Win. The target brake torque Tbr* is initialized to zero at the start of this processing routine and is incremented by accumulation of a preset torque ΔTbr in each repetition of steps S512 to S518. The target torques Tm1* and Tm2* of the motors MG1 and MG2 are recalculated according to Equations (7) and (8) as torques required to attain the torque demand Tr* and the target revolution speed Ne* of the engine 322 in response to output of a torque corresponding to the target brake torque Tbr* from the brake Br.

When it is determined at step S514 that the sum of the motor powers Pm1 and Pm2 is not less than the charge limit Win, the CPU 372 controls the engine 322 with fuel cutoff, the motors MG1 and MG2 to attain the target torques Tm1* and Tm2*, and the brake Br to attain the target brake torque Tbr* (step S520) and exits from this stop control routine. According to the concrete procedure, the CPU 372 sends control signals to the engine ECU 324 and the motor ECU 340 to control the engine 322 and the motors MG1 and MG2, while outputting a driving signal to the actuator of the brake Br to control the brake Br.

When it is determined at step S510 that the revolution speed Ne of the engine 322 is less than the preset threshold value Neref, the CPU 372 executes a pre-stop process (see FIG. 14) to set the target brake torque Tbr* (step S522), and controls the engine 322 with fuel cutoff, the motors MG1 and MG2 to attain the target torques Tm1* and Tm2*, and the brake Br to attain the target brake torque Tbr* set at step S522 (step S520). The details of the pre-stop process executed at step S522 is described with reference to the flowchart of FIG. 14.

Figure 15:
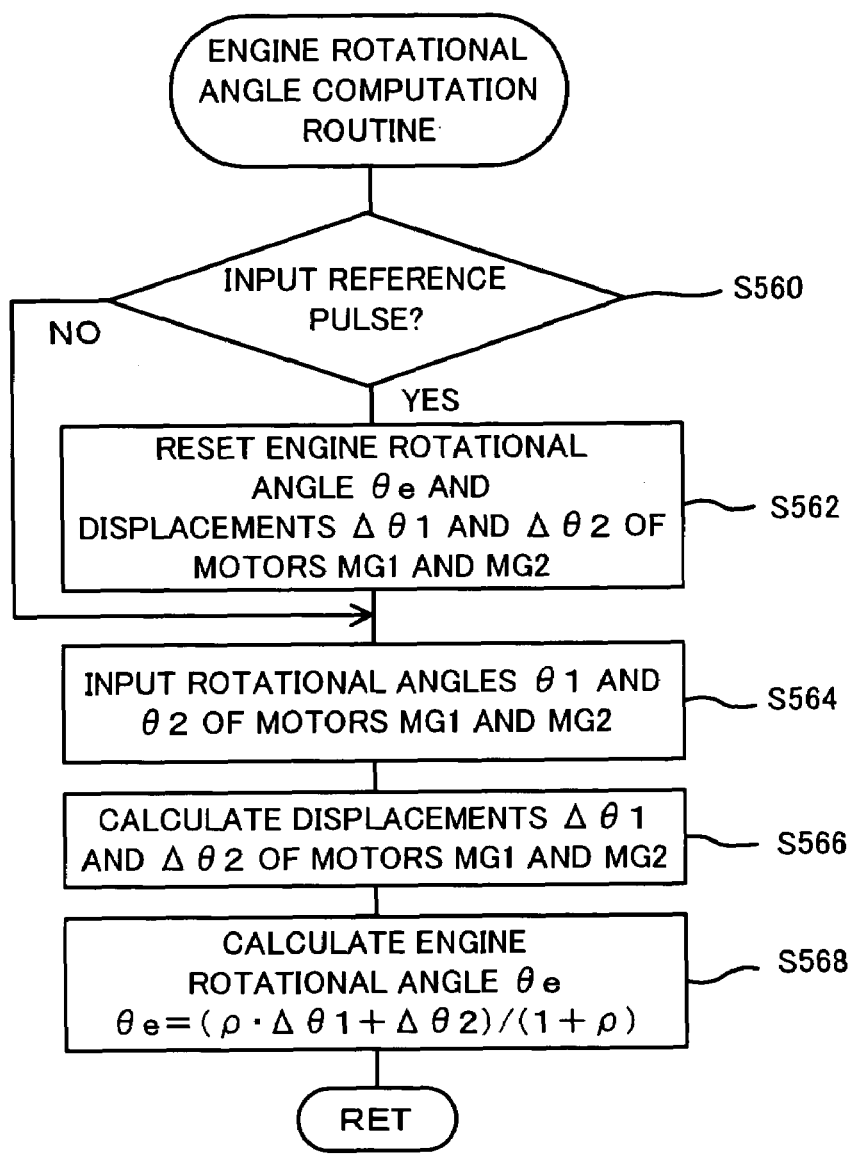
FIG. 15 is a flowchart showing an engine rotational angle computation routine executed by the hybrid electronic control unit in the hybrid vehicle of the fourth embodiment.

In the pre-stop process routine, the CPU 372 of the hybrid electronic control unit 370 first inputs an engine rotational angle θe (step S550). The engine rotational angle θe is calculated according to an engine rotational angle computation process shown in the flowchart of FIG. 15 and is written in a specific area of the RAM 376. The CPU 372 accordingly reads the engine rotational angle θe from the specific area of the RAM 376 at step S550. The engine rotational angle computation process resets the rotational angle θe of the engine 322 and displacements Δθ1 and Δθ2 of the motors MG1 and MG2 (step S562), in response to input of a reference pulse from a G sensor that outputs a reference rotational angle of the crankshaft 326 in the form of a pulse (step S560). The computation process then inputs rotational positions θ1 and θ2 of the motors MG1 and MG2 from the rotational position detection sensors 343 and 344 (step S564), calculates the displacements Δθ1 and Δθ2 of the motors MG1 and MG2 after the reset (step S566), and calculates the rotational angle θe of the engine 322 from the calculated displacements Δθ1 and Δθ2 and the gear ratio ρ set in the power distribution integration mechanism 330 according to Equation (9) given below (step S568).

$$\theta e = \frac{\rho \cdot \Delta\theta 1 + \Delta\theta 2}{(1+\rho)} \tag{9}$$

Figure 14:
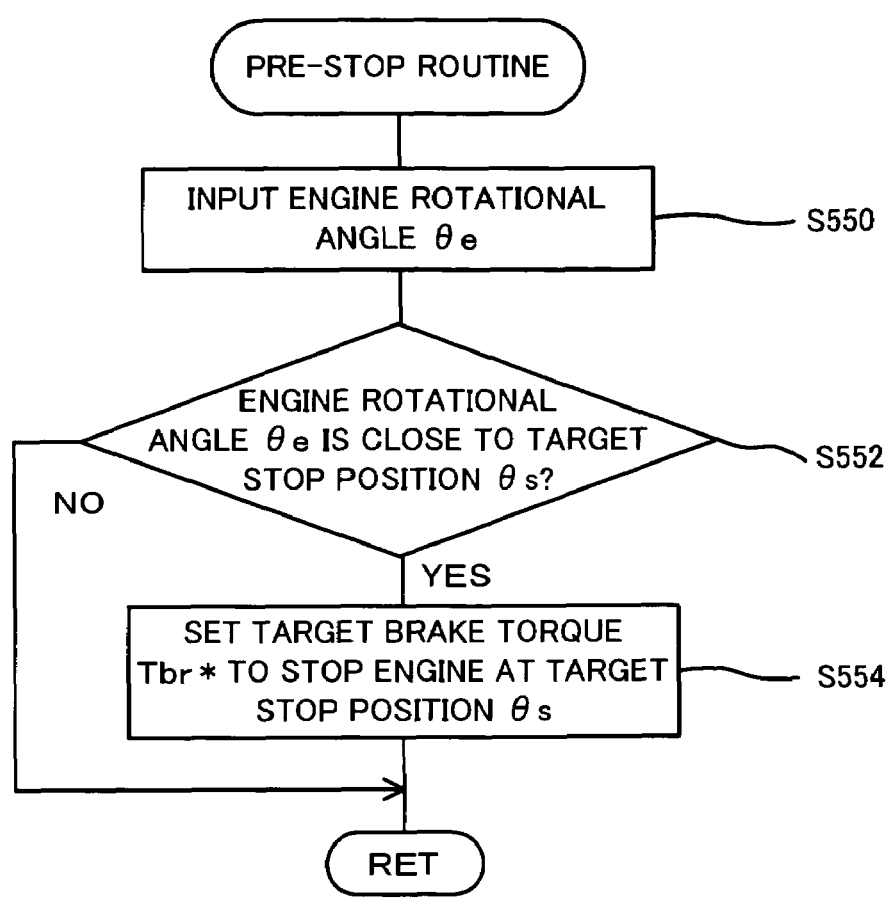
FIG. 14 is a flowchart showing the details of a pre-stop process executed at step S522 in the flowchart of FIG. 11.

Referring back to the flowchart of FIG. 14, after input of the calculated engine rotational angle θe, the CPU 372 determines whether the engine rotational angle θe is sufficiently close to a target stop position θs (step S552). When the engine rotational angle θe is sufficiently close to the target stop position θs, the CPU 372 sets the target brake torque Tbr* of the brake Br to stop the engine 322 at the target stop position θs (step S554). The target stop position θs is set to a position of ensuring a smooth restart of the engine 322, that is, approximately 90 degrees before or after a top dead center of a piston in the compression cycle in the four-cylinder engine 322 of this embodiment. The engine 322 does not have stable rotations immediately before its full stop. The engine 322 is accordingly stopped at the target stop position θs not by the motors MG1 and MG2 linked to the crankshaft 326 of the engine 322 via the power distribution integration mechanism 330 but by the brake Br directly connected to the crankshaft 326 of the engine 322.

As described above, the hybrid vehicle 320 of the fourth embodiment sets the target torques Tm1* and Tm2* of the motors MG1 and MG2 to make the sum of the motor powers Pm1 and Pm2 of the motors MG1 and MG2 not less than the charge limit Win of the battery 350 and controls the motors MG1 and MG2 to attain the target torques Tm1* and Tm2* in the process of stopping the engine 322. This arrangement effectively prevents the battery 350 from being overcharged or from being charged with an overvoltage on the power lines 354 but ensures a sufficient charge level of the battery 350, thus enhancing the energy efficiency. The brake Br directly connected to the crankshaft 326 of the engine 322 is used to eventually stop the engine 322 at the target stop position θs. This structure enhances the startability of the engine 322, while ensuring output of the torque demand Tr* to the ring gear shaft 332a or the drive shaft.

Figure 16:
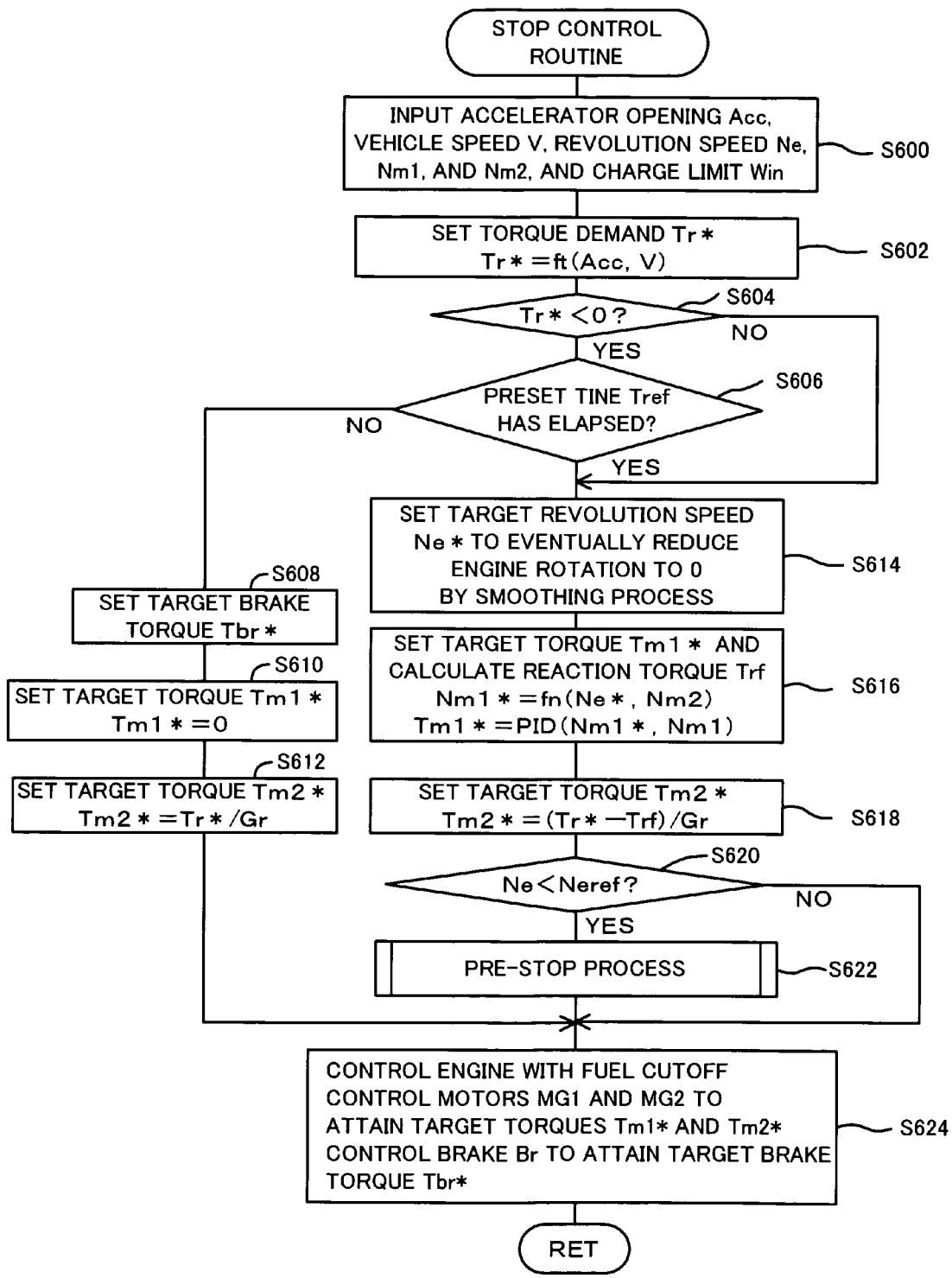
FIG. 16 is a flowchart showing another stop control routine executed in one modified example of the fourth embodiment.

The hybrid vehicle 320 of the fourth embodiment executes the stop control routine shown in the flowchart of FIG. 11 to stop the engine 322. The stop control routine of FIG. 11 may be replaced by another stop control routine shown in the flowchart of FIG. 16 to stop the engine 322. In the stop control routine of FIG. 16, the CPU 372 of the hybrid electronic control unit 370 first inputs the accelerator opening Acc, the vehicle speed V, the engine revolution speed Ne, and the motor revolution speeds Nm1 and Nm2 (step S600) and sets the torque demand Tr* to be output to the ring gear shaft 332a or the drive shaft corresponding to the input accelerator opening Acc and the input vehicle speed V (step S602). The processing of steps S600 and S602 is identical with the processing of steps S500 and S502 in the flowchart of FIG. 11. The CPU 372 subsequently determines whether a negative value is set to the torque demand Tr*, that is, whether a braking force is required (step S604). In the case of a negative torque demand Tr*, it is determined whether a preset time period tref has elapsed since the output of the stop command for stopping the operations of the engine 322, that is, since the start of this stop control routine (step S606). In the case where the torque demand Tr* is a negative value and where the preset time period tref has not yet elapsed since the output of the stop command of the engine 322, the CPU 372 sets the target brake torque Tbr* to gradually reduce the rotation of the engine 322 (step S608) and sets the value '0' to the target torque Tm1* of the motor MG1 (step S610). The CPU 372 sets division of the torque demand Tr* by the gear ratio G set in the reduction gear 335 to the target torque Tm2* of the motor MG2, in order to ensure output of the torque demand Tr* to the ring gear shaft 332a (step S612). The CPU 372 then controls the engine 322 with fuel cutoff, the motors MG1 and MG2 to attain the target torques Tm1* and Tm2*, and the brake Br to attain the target brake torque Tbr* set at step S522 (step S624). In the case where the torque demand Tr* is a positive value or where the preset time period tref has elapsed since the output of the stop command of the engine 322, on the other hand, the CPU 372 sets the target revolution speed Ne* of the engine 322 based on the input engine revolution speed Ne by the smoothing process or rating process (step S614). The CPU subsequently calculates the target revolution speed Nm1* of the motor MG1 from the preset target revolution speed Ne*, the input revolution speed Nm2 of the motor MG2, and the gear ratio ρ set in the power distribution integration mechanism 330 according to Equation (1) given above, calculates the target torque Tm1* to be output from the motor MG1 from the preset target revolution speed Nm1* and the input revolution speed Nm1 of the motor MG1 according to Equation (2) given above, and calculates the reaction torque Trf to cancel out the torque acting on the ring gear shaft 332a against output of the torque from the motor MG1 (step S616). The CPU 372 then calculates the target torque Tm2* of the motor MG2 from the preset torque demand Tr*, the reaction torque Trf, and the gear ratio Gr set in the reduction gear 335 according to Equation (3) given above (step S618). The processing of steps S614 to S618 is identical with the processing of steps S504 to S508 in the flowchart of FIG. 11. The revolution speed Ne of the engine 322 is then compared with a preset threshold value Neref (step S620). The threshold value Neref is identical with the threshold value Neref used at step S510 in the flowchart of FIG. 11. When the engine revolution speed Ne is less than the preset threshold value Neref, the CPU 372 executes the pre-stop process of FIG. 14 (step S622), and controls the engine 322 with fuel cutoff, the motors MG1 and MG2 to attain the target torques Tm1* and Tm2*, and the brake Br to attain the target brake torque Tbr* set at step S522 (step S624).

Figure 17:
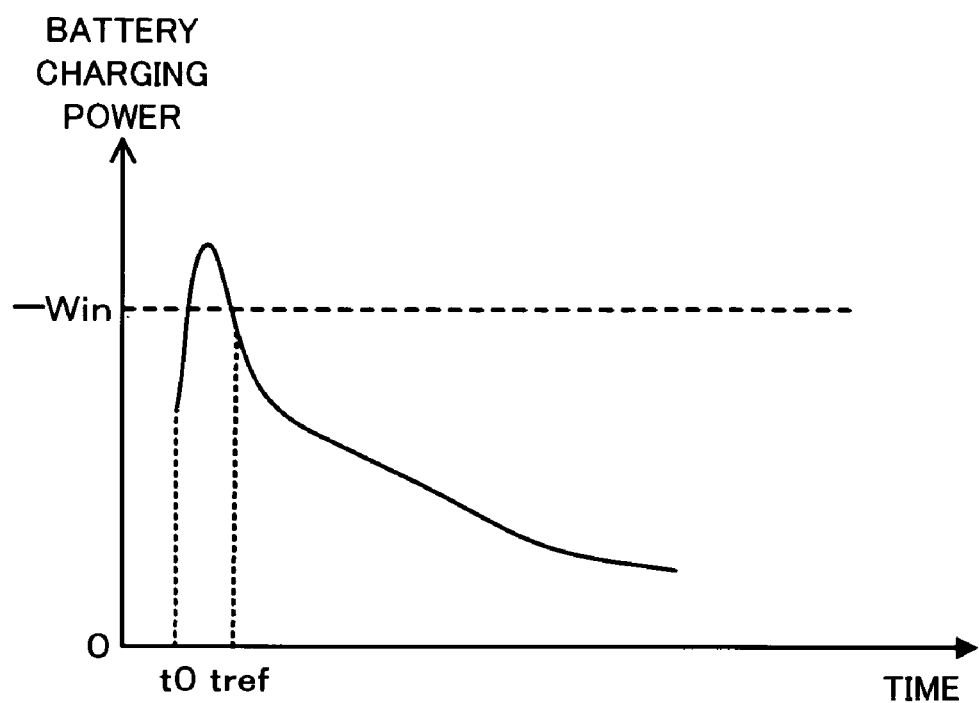
FIG. 17 shows a time variation in charging power of a battery when a motor MG1 is used to brake the engine.

FIG. 17 shows a time variation in charging power of the battery 350 in the state of braking the engine 322 not with the brake Br but with the motors MG1 and MG2 in response to a change of the torque demand Tr* to a negative value with release of the accelerator pedal 383. As shown in this graph, even when the fuel supply is cut off immediately after a stop command of the engine 322 (at a time point t0) under the negative setting of the torque demand Tr*, the engine 322 continues rotating by the force of inertia. In order to brake the engine 322 against this force of inertia, a relatively small negative value (corresponding to a large generated output) is set to the target torque Tm1* of the motor MG1. A negative value is also set to the target torque Tm2* of the motor MG2 to ensure output of a braking torque corresponding to the torque demand Tr* to the ring gear shaft 332a. Such settings may cause the electric power generated by the motors MG1 and MG2 to exceed the charge limit Win of the battery 350. The procedure of the embodiment accordingly uses the brake Br to brake the engine 322 until elapse of the preset time period tref during which the motors MG1 and MG2 possibly generate the electric power over the charge limit Win of the battery 350. This desirably prevents the battery 350 from being overcharged or being charged with overvoltage. The stop control routine of FIG. 16 uses only the brake Br to brake the engine 322 until elapse of the preset time period tref since the output of the stop command of the engine 322 under the negative setting of the torque demand Tr*. One possible modification may utilize both the braking torque of the motors MG1 and MG2 and the braking torque of the brake Br to brake the engine 322, as long as the generated electric power of the motors MG1 and MG2 does not exceed the charge limit Win of the battery 350.

In the hybrid vehicle 320 of the fourth embodiment, the target stop position θs is set to approximately 90 degrees before or after the top dead center of the piston in the compression cycle in the 4-cylinder engine. This setting is, however, not restrictive and may be modified according to the number of cylinders in the engine and other characteristics of the engine.

The hybrid vehicle 320 of the fourth embodiment calculates the displacements Δθ1 and Δθ2, which are reset by input of the reference pulse, from the rotational positions θ1 and θ2 of the motors MG1 and MG2 detected by the rotational position detection sensors 343 and 344, and determines the engine rotational angle θe according to the calculated displacements Δθ1 and Δθ2 and the gear ratio ρ set in the power distribution integration mechanism 330. The rotational angle of the engine 322 may be detected directly.

Figure 18:
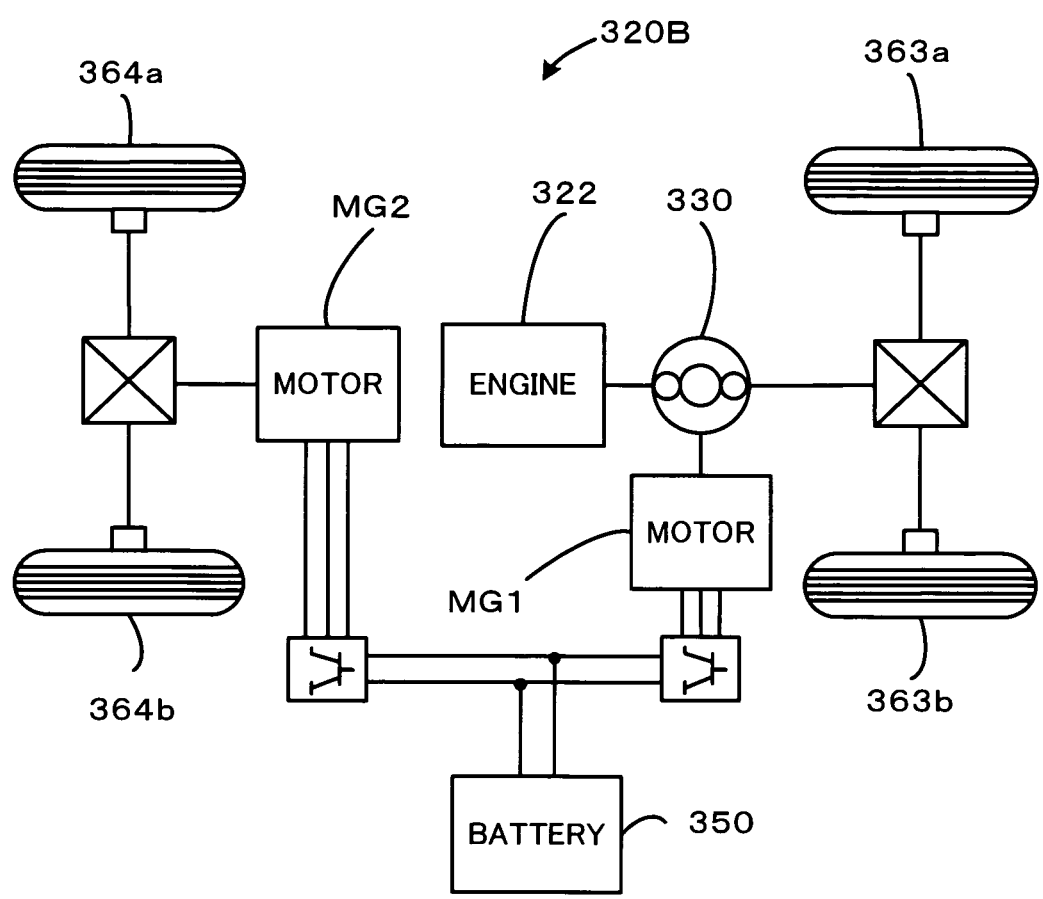
FIG. 18 schematically illustrates one modified structure of the hybrid vehicle.

In the hybrid vehicle 320 of the fourth embodiment, the power of the motor MG2 is subjected to gear change by the reduction gear 335 and is output to the ring gear shaft 332a. In one possible modification shown as a hybrid vehicle 320B of FIG. 18, the power of the motor MG2 may be output to another axle (that is, an axle linked with wheels 364a and 364b), which is different from an axle connected with the ring gear shaft 332a (that is, an axle linked with the drive wheels 363a and 363b).

Figure 19:
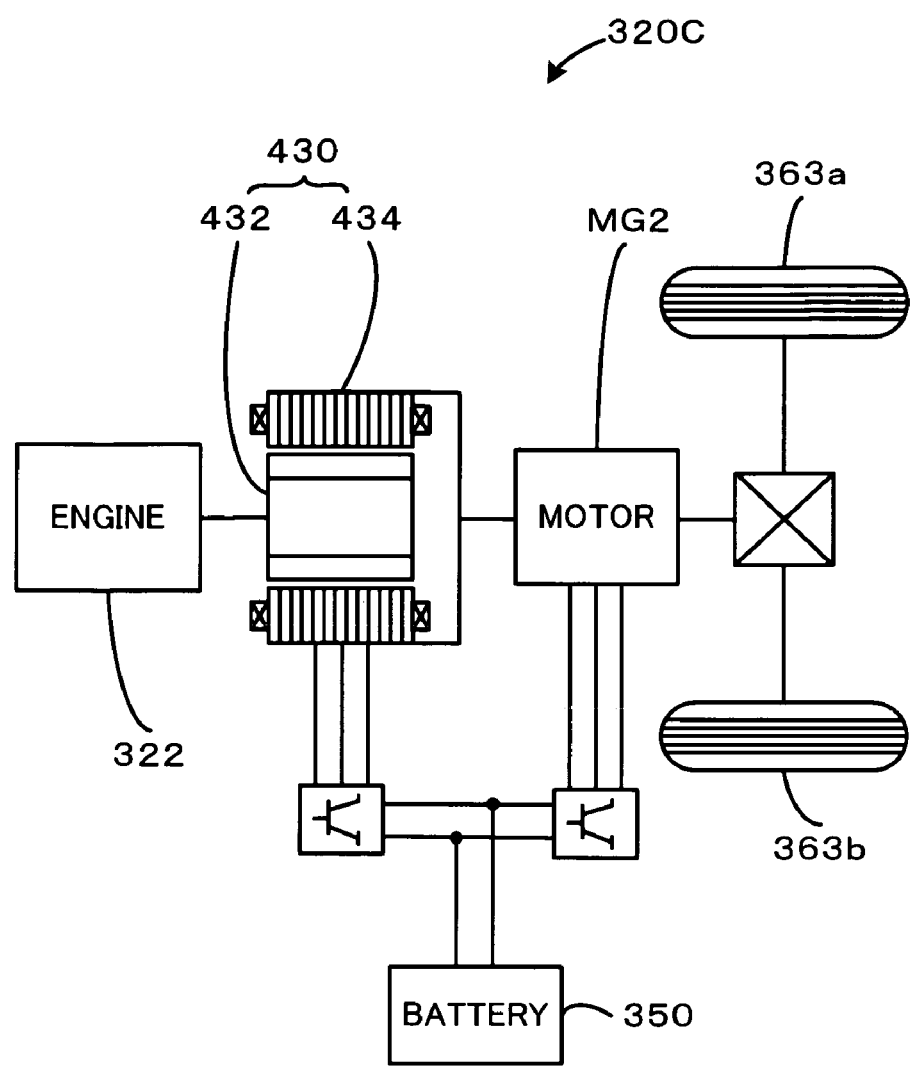
FIG. 19 schematically illustrates another modified structure of the hybrid vehicle.

In the hybrid vehicle 320 of the fourth embodiment, the power of the engine 322 is output via the power distribution integration mechanism 330 to the ring gear shaft 332a or the drive shaft linked with the drive wheels 363a and 363b. In another possible modification of FIG. 19, a hybrid vehicle 320C may have a pair-rotor motor 430, which has an inner rotor 432 connected with the crankshaft 326 of the engine 322 and an outer rotor 434 connected with the drive shaft of outputting the power to the drive wheels 363a, 363b and transmits part of the power output from the engine 322 to the drive shaft while converting the residual part of the power into electric power.

The technique of the invention is not restricted to the automobile but may be applied to diversity of other moving bodies including ships, boats, and aircraft as well as to variety of stationary devices, as long as the moving body or the stationary device has a motor generator attached directly or indirectly to an output shaft of an engine and a brake mechanism attached to the output shaft of the engine to mechanically brake the output shaft.

The embodiments and their modified examples discussed above are to be considered in all aspects as illustrative and not restrictive. There may be many other modifications, changes, and alterations without departing from the scope or spirit of the main characteristics of the present invention.

All changes within the meaning and range of equivalency of the claims are intended to be embraced therein. The scope and spirit of the present invention are indicated by the appended claims, rather than by the foregoing description.

The disclosure of Japanese Patent Application No. 2004-040051 filed Feb. 17, 2004, No. 2004-057547 filed Mar. 2, 2004, No. 2004-263386 filed Sep. 10, 2004 including specification, drawings and claims is incorporated herein by reference in its entirety.

What is claimed is:

1. A drive system of driving a drive shaft, said drive system comprising:
    an internal combustion engine having a crankshaft as its output shaft;
    a position holding module that is directly attached to the crankshaft of said internal combustion engine and applies either of an electromagnetic force and a mechanical force to hold the crankshaft at a preset rotational position; and
    a stop control module that, in response to fulfillment of a predetermined stop condition, controls said internal combustion engine and said position holding module to stop said internal combustion engine while holding the crankshaft at the preset rotational position;
    wherein said position holding module applies an electromagnetic attraction force to part of a counterweight attached to the crankshaft as an attraction target, so as to hold the crankshaft at the preset rotational position.

2. A drive system in accordance with claim 1, wherein said position holding module comprises an electromagnetic attraction unit that is positioned to stop and hold the crankshaft at the preset rotational position when the electromagnetic attraction force is applied to the attraction target.

3. A drive system in accordance with claim 2, wherein said stop control module controls the electromagnetic attraction unit of said position holding module to apply the electromagnetic attraction force to the attraction target at a specific alignment timing of the attraction target with the electromagnetic attraction unit after a rotation speed of the crankshaft becomes less than a predetermined revolution speed with a stop of operation of said internal combustion engine.

* * * * *